(12) United States Patent
Seidman

(10) Patent No.: US 10,931,812 B2
(45) Date of Patent: Feb. 23, 2021

(54) COMMUNICATION SYSTEM AND METHOD OF GAFFE PREVENTION

(71) Applicant: Brett Seidman, Sherman Oaks, CA (US)

(72) Inventor: Brett Seidman, Sherman Oaks, CA (US)

( * ) Notice: Subject to any disclaimer, the term of this patent is extended or adjusted under 35 U.S.C. 154(b) by 0 days.

(21) Appl. No.: 16/451,679

(22) Filed: Jun. 25, 2019

(65) Prior Publication Data

US 2019/0320060 A1    Oct. 17, 2019

Related U.S. Application Data

(63) Continuation-in-part of application No. 16/043,020, filed on Jul. 23, 2018, now Pat. No. 10,334,408, which is a continuation of application No. 15/854,026, filed on Dec. 26, 2017, now abandoned.

(60) Provisional application No. 62/441,129, filed on Dec. 30, 2016.

(51) Int. Cl.
| | |
|---|---|
| *H04W 4/00* | (2018.01) |
| *H04M 1/725* | (2021.01) |
| *H04W 4/12* | (2009.01) |
| *H04L 12/58* | (2006.01) |
| *G06F 40/279* | (2020.01) |
| *G06F 3/0482* | (2013.01) |

(52) U.S. Cl.
CPC ...... *H04M 1/72552* (2013.01); *G06F 40/279* (2020.01); *H04L 51/16* (2013.01); *H04L 51/20* (2013.01); *H04L 51/32* (2013.01); *H04W 4/12* (2013.01); *G06F 3/0482* (2013.01); *H04M 2201/42* (2013.01)

(58) Field of Classification Search
CPC ....... H04W 4/12; H04W 8/245; H04W 88/02; G06Q 50/01; H04L 51/12; H04M 1/72519; H04M 1/72522
USPC ...................... 455/466, 418, 550.1
See application file for complete search history.

(56) References Cited

U.S. PATENT DOCUMENTS

| | | | |
|---|---|---|---|
| 9,356,712 B2* | 5/2016 | Campbell | H04B 17/23 |
| 2003/0204844 A1* | 10/2003 | Brant | H04H 20/14 |
| | | | 725/22 |
| 2009/0248669 A1* | 10/2009 | Shetti | G06F 16/3322 |
| 2010/0106671 A1* | 4/2010 | Li | G06N 5/04 |
| | | | 706/46 |
| 2011/0055334 A1* | 3/2011 | Tivyan | H04L 51/30 |
| | | | 709/206 |
| 2013/0073336 A1* | 3/2013 | Heath | G06Q 30/02 |
| | | | 705/7.29 |

(Continued)

*Primary Examiner* — Dahn C Le

(74) *Attorney, Agent, or Firm* — Michael L. Greenberg, Esq.; Greenberg & Liberman, LLC

(57) ABSTRACT

A system and method for transmitting and receiving communications via an application running on a communication device is described. The system equips a user with tools configured to facilitate the editing of transmitted messages, the transmission of messages at a user-selected time, messages configured to automatically expire at a user-specified time after the recipient has opened the messages, and messages and social media posts screened for black-listed alert words. Blip messages are designed to leave no trace of their transmission or reception, and preferably expire after the sender-defined view time has passed. The system is envisioned for use across multiple platforms including social media and internet messaging, and is not limited to the mobile messaging market.

10 Claims, 53 Drawing Sheets

(56) References Cited

U.S. PATENT DOCUMENTS

| | | | |
|---|---|---|---|
| 2015/0058330 A1* | 2/2015 | Carroll | G06F 16/9535 707/723 |
| 2016/0277328 A1* | 9/2016 | Ishizuka | H04N 21/8547 |

* cited by examiner

```
96   /**
97    * Handle action Connect in the provided background thread
98    */
99   private void handleActionConnect(){
100      try {
101          BaxderXmppConnection.getInstance().xmppConnect(Constants.CHAT_IP, 5222, getApplicationContext());
102      } catch (XMPPException | SmackException | IOException e) {
103          e.printStackTrace();
104      }
105  }
```

FIG. 6A

```
114  public void sendMessage(String buddyId,Message message) throws XMPPException, NotConnectedException,
     NotLoggedInException {
115      if(!mConnection.isAuthenticated())
116          throw new NotLoggedInException();
117      mChatManager = ChatManager.getInstanceFor(mConnection);
118      mChat = mChatManager.createChat(buddyId+"@"+Constants.CHAT_IP, null);
119      mChat.sendMessage(message);
120  }
121
```

FIG. 6B

```
71  private void startSend(){
72    try {
73      BaxderXmppConnection.getInstance().sendMessage(mToUserId, mMessageId, mMessage, mProperties);
74      mListener.onMessageSent(mMessageId);
75    } catch (XMPPException | SmackException.NotConnectedException | SmackException.NotLoggedInException e) {
76      e.printStackTrace();
77      mListener.onMessageFailed(mMessageId);
78    }
79  }
```

FIG. 6C

```
49  try {
50      JSONObject messageObj = new JSONObject(msgData);
51      if(messageObj.has(Constants.CONTENT_TYPE))
52          mContentType = messageObj.getString(Constants.CONTENT_TYPE);
53      if(messageObj.has(Constants.IMAGE_URL))
54          mImageUrl = messageObj.getString(Constants.IMAGE_URL);
55      else mImageUrl = null;
56      if(messageObj.has(Constants.VIDEO_URL))
57          mVideoUrl = messageObj.getString(Constants.VIDEO_URL);
58      else mVideoUrl = null;
59      if(messageObj.has(Constants.IMAGE_URI))
60          mImageUri = messageObj.getString(Constants.IMAGE_URI);
61      else mImageUri = null;
62      if(messageObj.has(Constants.VIDEO_URI))
63          mVideoUri = messageObj.getString(Constants.VIDEO_URI);
64      else mVideoUri = null;
65      if(messageObj.has("message"))
66          mMessage = messageObj.getString("message");
67      if(messageObj.has("time"))
68          mTimestamp = messageObj.getString("time");
69      if(messageObj.has("is_send"))
70          isSendMessage = messageObj.getBoolean("is_send");
```

FIG. 6D

```
71  if(messageObj.has(Constants.DELIVERY_STATUS))
72      mDeliveryStatus = messageObj.getString(Constants.DELIVERY_STATUS);
73  if(messageObj.has(Constants.BLURED_IMAGE))
74      mBluredImage = messageObj.getString(Constants.BLURED_IMAGE);
75  else mBluredImage = null;
76  if(messageObj.has("is_edited"))
77      isEditedMessage = messageObj.getBoolean("is_edited");
78  if(messageObj.has("edited_time"))
79      mEditedTimeStamp = messageObj.getString("edited_time");
80  if(messageObj.has("is_seen"))
81      isMessageSeen = messageObj.getBoolean("is_seen");
82  if(messageObj.has("is_deleted"))
83      isDeletedMessage = messageObj.getBoolean("is_deleted");
84  } catch (JSONException e) {
85      e.printStackTrace();
86  }
87
88  }
89  public String getChatDataJsonString(){
90      JSONObject messageObj = new JSONObject();
91
```

FIG. 6E

```
92   try {
93       messageObj.put(Constants.CONTENT_TYPE, mContentType);
94   if(mImageUrl != null)
95       messageObj.put(Constants.IMAGE_URL, mImageUrl);
96   else if(mVideoUrl != null)
97       messageObj.put(Constants.VIDEO_URL, mVideoUrl);
98   if(mImageUri != null)
99       messageObj.put(Constants.IMAGE_URI, mImageUri);
100  else if(mVideoUri != null)
101      messageObj.put(Constants.VIDEO_URI, mVideoUri);
102  if(isEditedMessage == true)
103      messageObj.put("is_edited", isEditedMessage);
104  if(mEditedTimeStamp != null)
105      messageObj.put("edited_time", mEditedTimeStamp);
106  if(mMessage != null)
107      messageObj.put("message", mMessage);
108  if(mTimestamp != null)
```

FIG. 6F

```
109  messageObj.put("time", mTimestamp);
110  messageObj.put("is_send", isSendMessage);
111  if(mDeliveryStatus != null)
112     messageObj.put(Constants.DELIVERY_STATUS, mDeliveryStatus);
113  if(mBlurredImage != null)
114     messageObj.put(Constants.BLURED_IMAGE, mBlurredImage);
115  if(isMessageSeen == true)
116     messageObj.put("is_seen", isMessageSeen);
117  if(isDeletedMessage == true)
118     messageObj.put("is_deleted", isDeletedMessage);
119  } catch (JSONException e) {
120     e.printStackTrace();
121  }
122  return messageObj.toString();
123
124
```

FIG. 6G

```
125  protected ChatMsgData(Parcel in) {
126      mTimestamp = in.readString();
127      mMessage = in.readString();
128      mContentType = in.readString();
129      mVideoUri = in.readString();
130      mVideoUrl = in.readString();
131      mBlurredImage = in.readString();
132      mImageUrl = in.readString();
133      mImageUri = in.readString();
134      isSendMessage = in.readByte() != 0x00;
135      isEditedMessage = in.readByte() != 0x00;
136      mEditedTimeStamp = in.readString();
137      mDeliveryStatus = in.readString();
138      isMessageSeen = in.readByte() != 0x00;
139      isDeletedMessage = in.readByte() != 0x00;
140  }
141
```

FIG. 6H

```
142  @Override
143  public int describeContents() {
144      return 0;
145  }
146
147  @Override
148  public void writeToParcel(Parcel dest, int flags) {
149      dest.writeString(mTimestamp);
150      dest.writeString(mMessage);
151      dest.writeString(mContentType);
152      dest.writeString(mVideoUri);
153      dest.writeString(mVideoUrl);
154      dest.writeString(mBlurredImage);
155      dest.writeString(mImageUrl);
156      dest.writeString(mImageUri);
157      dest.writeByte((byte) (isSendMessage ? 0x01 : 0x00));
158      dest.writeByte((byte) (isEditedMessage ? 0x01 : 0x00));
159      dest.writeString(mEditedTimeStamp);
160      dest.writeString(mDeliveryStatus);
161      dest.writeByte((byte) (isMessageSeen ? 0x01 : 0x00));
162      dest.writeByte((byte) (isDeletedMessage ? 0x01 : 0x00));
163  }
```

FIG. 61

```
138  public void onSendButtonClick(){
137    if(mView == null){
138      return;
139    String message = mView.getInputMessage();
140    if(message == null || message.isEmpty()) {
141      mView.showToast("Please enter a message to send");
142      return;
143    }
144    if(mBaxderContact == null || !mBaxderContact.isFreeFlowOn()){
145      new AlertWordChecker(message,BaxderMessageType.BAXDER_CHAT,ChatConversationPresenter.this).startAlertWordChecking();
146    }else {
147      mView.clearInputMessage();
148      addChatDataToDB(createChatRowDataObj(message,null,null,Constants.TYPE_TEXT));
```

FIG. 7A

```
18  public class AlertWordChecker implements FetchAlertWordsListener, SearchAlertWordsListener {
19
20      private String mMessage;
21      private BaxderMessageType mBaxderMessageType;
22      private Listener mListener;
23
24      public AlertWordChecker(String message,BaxderMessageType baxderMessageType,Listener listener){
25          mMessage = message;
26          mBaxderMessageType = baxderMessageType;
27          mListener = listener;
28      }
29
30      public void startAlertWordChecking(){
31          new FetchAlertWords(BaxderApplication.get(), mBaxderMessageType, AlertWordChecker.this).execute();
32      }
33
34      @Override
35      public void savedAlertWords(ArrayList<AlertWord> alertWords) {
36          new SearchAlertWords(alertWords, mMessage, AlertWordChecker.this);
37      }
38
```

FIG. 7B

```
public boolean searchAlertWords(String str){
151     for(int i=0;i<mAlertWords.size();i++){
152         String regix = "\\W";
153         String alertWord = mAlertWords.get(i).mAlertWord.replaceAll(regix, "").toLowerCase();
154         String input = str.replaceAll(regix, "").toLowerCase();
155         if(alertWord.equals(input))
156             return true;
157         /*int distance = new LevenshteinDistance().getLevenshteinDistance(input,alertWord);
158         if(distance<3){
159             return true;
160         }
161         }*/
162     return false;
163 }
```

FIG. 7C

```
private void startUiUpdateTask(){
    mUiUpdateHandler.post(mUpdateUi);
} private void stopUiUpdateTask(){
    mUiUpdateHandler.removeCallbacks(mUpdateUi);
} private Runnable mUpdateUi = new Runnable(){
    @Override
    public void run() {
        updateProgress();
        mUiUpdateHandler.postDelayed(mUpdateUi, 1000);
    }
};
```

FIG. 7D

```
48  public void updateProgress(){
49    try{
50      for(AggregateInboxRow blipRow:mBlipRows)
51        blipRow.updateProgress();
52    } catch(ConcurrentModificationException e){
53    }
54
55  }
```

FIG. 7E

```
435  public void updateProgress(){
436    if(!isProgressStarted)
437      return;
438    int remainingTime = getRemainigTime();
439    int progressPercent = getProgressPercent();
440    setRemaningTimeText(remainingTime);
441    setRemainingTimeInDialog(remainingTime);
442    setProgress(progressPercent);
443    if(remainingTime == 0 || progressPercent == 100){
444      stopDialog();
445      deleteBlip(mBlipsRowData.mUserId,
mBlipsRowData.mMessageId);
446    }
447  }
448
449  }
```

FIG. 7F

```
9   public class CreateTimerRequest extends AsyncTask<Void, Void, String> {
10
11      private String mMsgData;
12
13      private String mSendTimeInUtcSecs;
14
15      private CreateTimerListener mTimerRequestListener;
16
17
18      public CreateTimerRequest(String msgData,String sendTimeInUtcSeconds,CreateTimerListener
createTimerListener) {
19          mMsgData = msgData;
20          mSendTimeInUtcSecs = sendTimeInUtcSeconds;
21          mTimerRequestListener = createTimerListener;
22
23      }
...
43
44      private void broadcastResult(String result){
45          if(mTimerRequestListener == null)
46              return;
47          if(result == null)
48              mTimerRequestListener.onTimerRequestFailed();
49          else mTimerRequestListener.onTimerCreateResponse(result);
50      }
```

FIG. 7H

```
399  private void sendTimerRequest(TimerMessage timerMessage){
400      String timerMsgStanza = getTimerMsgStanza(mTimerMessage);
401      String sendTimesSecs = DateFormater.milliSecToSecs(timerMessage.getSendTime());
402      if(mTimerMessage.getTimerId() == null){
403          new CreateTimerRequest(timerMsgStanza, sendTimesSecs,ComposeTimerPresenter.this).execute();
404      }else {
405          new UpdateTimerRequest(mTimerMessage.getTimerId(),timerMsgStanza,
sendTimesSecs,ComposeTimerPresenter.this).execute();
406      }
407  }
```

FIG. 71

So thirsty! Will be drinking lots of water as soon as I get to Flint

— The drinking water source for the city of Flint, Michigan was changed from Lake Huron and the Detroit River to the cheaper Flint River.
As a result, there was a series of problems that culminated with lead contamination, creating a serious public health danger. The Flint River water that was treated improperly caused lead from aging pipes to leach into the water supply, leading to extremely elevated levels of the heavy metal neurotoxin.

DELETE   EDIT   SEND

FIG. 33

COMMUNICATION SYSTEM AND METHOD OF GAFFE PREVENTION

CONTINUITY

This application is a continuation-in-part of continuation patent application Ser. No. 16/043,020, filed on Jul. 23, 2018, which directs to non-provisional patent application Ser. No. 15/854,026, filed on Dec. 26, 2017, which is of provisional patent application No. 62/441,129, filed on Dec. 30, 2016, and priority is claimed thereto.

FIELD OF THE PRESENT INVENTION

The present invention relates to a method and system of conveying information, and more specifically relates to a means by which a user may convey text and/or audio-visual messages to another user which expire according to a pre-established timer, are encrypted, are editable post transmission, and may optionally be filtered for key alert words (both positive and negative), via communication devices.

BACKGROUND OF THE PRESENT INVENTION

Messaging is one of a bundle of services that are provided with cellular phone services. Messaging may be estimated as a $300 Billion dollar industry, and it shows no sign of abating. Indeed, messaging itself is estimated to grow by almost an additional $30 billion per year in the upcoming years.

However, it is known that many consumers desire more control over their messaging. This need stems from such rationales as the risk of sending the wrong message to an incorrect recipient, sending an unartfully worded message, or sending a message composed when the writer is in an agitated emotional state or an otherwise regrettable message being transmitted. This similarly extends to unintended or hasty social media posts, which may contain words that can get the sending individual in trouble personally, professionally, or socially—or may simply demonstrate the user's lack of awareness about a subject's state-of-affairs. Occasionally, an individual may send a message (or submit a social media post) and ultimately wish that he or she could remove a message from the device of the receiver post-transmission. Often, by taking a little bit of extra time to think about a message or post that has been composed before it is actually sent or posted can nudge the individual away from making a critical mistake.

Every person who uses messaging or social media is at risk to these problems. Presently, there are approximately 6.8 billion active mobile subscriptions among a population of 7.25 billion human beings. If there were a way in which users could ensure that incorrect messages, poorly written messages, or messages/social media posts containing detrimental wording are not sent, either by accident or otherwise, the use of messaging and social media on communication devices could be greatly enhanced. Additionally, if users were afforded the ability to edit messages post-transmission, users could effectively avert disaster in the event that a message is sent to the incorrect recipient, or a message is sent to a recipient that contains inappropriate or undesirable content.

Thus, there is a need in the art for a messaging and social media alert system solution that addresses deficiencies of prior art messaging technologies. Such a system is preferably equipped with features configured to facilitate safe and effective message transmission and reception. Features of such a system preferably include the ability to edit sent messages, the ability to send messages at a pre-established time in the future, the ability to send messages configured to expire after a pre-established time period has passed after opening the received message, the ability to blacklist specific words and be alerted to their use within a message or social media post prior to message transmission, and the ability to whitelist specific words and phrases to be posited as alternate suggestions to a user's initial message draft.

SUMMARY OF THE PRESENT INVENTION

The present invention provides a method and system for sending and receiving communications, including but not limited to text based messages (chats), images, audio, and video via a communication device application installed on a compatible communication device. Messages and social media posts transmitted via the system of the present invention may therefore include one or more of the following: video, voice memo, music (mp3, etc), .gif files, stickers, document files (pdf, xls, doc,), maps (locations), contact card info, and other similar digital files. In addition to conventional messaging application features, the present invention is equipped with Blips (messages that expire within a limited time span in which the message may be viewed by the recipient), black-listed word alerts, and timed messages. Perhaps most importantly, the system of the present invention affords the user the capacity to amend messages (edit and/or delete) after they have been sent to the recipient (or even read by the recipient), providing a great level of message control to the user. This remains true regardless of how deep the message may get buried by subsequent messages within the chat history or conversation of the chat, or how much time has passed—at any time the sender wishes, he or she may delete any message from both the sender's and receiver's devices. When a user deletes a message, he or she may select to delete the message from his/her device, it is also deleted from the sender's device. If the recipient opts to delete a received message, the message is not deleted from the sender's device. In any instance of a deletion, no trace of the message is left within the conversation thread. Additionally, the recipient is not informed when a message is deleted on his or her device by request of the sender.

Additional features of the present invention preferably include group messaging, SMS messaging (to native communication device SMS applications), and predictive alert word recognition. It is envisioned that the system of the present invention will preferably be configured to work with social media communications, email communications, and internet (such as message board) communications with APIs used natively through the communication device application of the present invention, or outside of the application with an expansion subscription (Twitter™, Facebook™, Instagram™, Pinterest™, LinkedIn™, Yelp™, Google™ Chrome™, Apple™ Safari™, Gmail™, AOL™ mail, etc.) to provide the user with a higher level of message control than is provided by default from these services. The features of the present invention are described in detail in the detailed description portion of the application.

BRIEF DESCRIPTION OF THE DRAWINGS

The present invention will be better understood with reference to the appended drawing sheets, wherein:

FIG. 5E illustrates a fifth stage of an example screen interface of the timer control of the present invention.

FIG. 6A contains example code used in the creation of the messaging control of the present invention.

FIG. 6B contains example code used in the creation of the messaging control of the present invention.

FIG. 6C contains example code used in the creation of the messaging control of the present invention.

FIG. 6D contains example code used in the creation of the messaging control of the present invention.

FIG. 6E contains example code used in the creation of the messaging control of the present invention.

FIG. 6F contains example code used in the creation of the messaging control of the present invention.

FIG. 6G contains example code used in the creation of the messaging control of the present invention.

FIG. 6H contains example code used in the creation of the messaging control of the present invention.

FIG. 6I contains example code used in the creation of the messaging control of the present invention.

FIG. 7A contains example code of the alert words control of the present invention.

FIG. 7B contains example code of the alert words control of the present invention.

FIG. 7C contains example code of the alert words control of the present invention.

FIG. 7D contains example code of the blip control of the present invention.

FIG. 7E contains example code of the blip control of the present invention.

FIG. 7F contains example code of the blip control of the present invention.

FIG. 7H contains example code of the timer control of the present invention.

FIG. 7I contains example code of the timer control of the present invention.

FIG. 33 exhibits a view of the trending alert pop-up dialog, including an explanation as to the reasoning behind the alert.

DETAILED DESCRIPTION OF THE PREFERRED EMBODIMENT

The present invention is a communication system to be used by users via a network-connected device, preferably a communication device (100). The system provides users with a variety of message-based services and features that are configured to facilitate greater control over the user's messages, both before and after the messages are sent to recipients. Additionally, the system provides users with the ability to filter and evaluate pending social media posts prior to submission. The system of the present invention enables users to transmit and receive a wide assortment of media forms beyond text, including but not limited to videos, voice memos, music (mp3, .WMA, .wav, etc), .gif files, stickers, document files (pdf, xls, doc,), maps (locations), contact card information, and other similar digital files.

Figure 1:
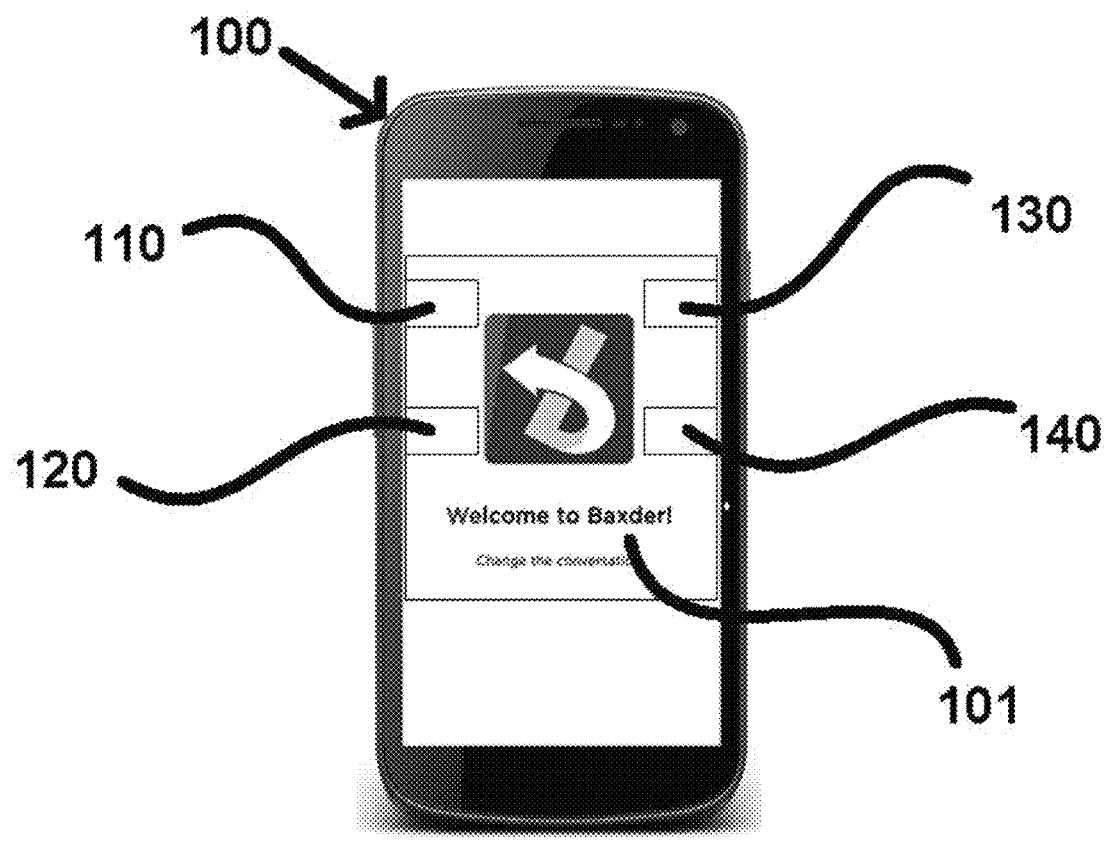
FIG. 1 exhibits a communication device that includes a block diagram of four areas of communications enhancement of the cell phone application of the present invention, namely: a messaging control, an alert words control, a blip control, and a timer control.

A communication device (100), notably a cellular ("cell") phone, is illustrated in FIG. 1. The communication device (100) is illustrated as including a user application ("app") (101), which is in turn illustrated as having a block diagram that includes a messaging control (110), an alert words control (120), a blips control (130), and a timer control (140). The application (101) of the present invention is configured to interface with a server via the internet to facilitate message transmission and/or social media post submission. Each of these controls (110-140) within the application (101) affords users greater flexibility and control over social media posts to be submitted, messages to be sent, as well as over messages that have already been sent, than that of the prior art. The app (101) generally includes editing/deleting control over sent/received/seen or unsent messages. Additionally, the user is prompted to "edit," "delete," or "send as-is" a message or social media post if the system detects the presence of an alert word (155) within the message or social media post.

Via these controls (110-140), the present invention enables users to send and receive two primary forms of transmissions within the application (101) itself: Blips (transmissions designed to expire, and therefore be automatically deleted after a user-selected time period has elapsed) and messages. Both forms of transmissions may be configured to be sent at a user-defined time in the future via the timer control (140). Similarly, portions of these features are available to social media avenues of communication and posting.

The messaging control (110) of the app (101) allows a user to delete or edit messages that have already been sent, on both the sending device, such as the communication device (100), and a second device, such as a second cell phone or receiving communication device (not illustrated), referenced as the receiver or recipient. The messaging control (110) allows a user editing control over each sent message, as will be discussed below.

The alert words control (120) allows for programming and/or detecting alert words (155) that will stop or delay a message if specific alert words (155) are contained with the message, and further informing the user that an alert word has been detected in a message, thereby allowing the user to reconsider use of the word within the message.

Alert words control (120) provides for the creation and activation of alert words in three groups: user-curated alert words, employer-curated alert words, and trending alert words. Words within groups may overlap. In one aspect, the alert words control (120) allows for entry of, and detection for, a personal list of words and/or symbols that could impulsively be sent by a user by mistake or without taking sufficient time to think about an outcome. With the alert words control (120), previously-identified suspect words (referenced as alert words (155)) are detected within a message before the communication (message or social media post) containing these suspect words is sent, and users are provided the option to either "Send", "Edit" or "Delete" the personal or social message. The user may select which words should be black-listed as alert words (155) via the alert words control (120) by manually typing the alert words (155), and adding them to an alert words list (165). An add button (185) facilitates the addition of an alert word (155) to the alert words list (165) manually as shown in FIG. 33. Similarly, for the employer-curated alert words, a manager or HR representative of the user's workplace may institute their own alert words to ensure taboo or negative posts and messages are not communicated, preventing potential PR issues. An alert words list may be unique for each contact, or may be generalized for use in all conversations with all contacts. Additionally, it is envisioned that some embodiments of the present invention may automatically add certain words to an alert words list (165) based on machine learning inferred from previous conversations.

Similarly, the third type of alert words (155), the trending alert words, is preferably curated in response to current events, and therefore requires carefully timed curation to be effective. Trending alert words are special in that a user may opt-in, whether through a subscription-based model or otherwise, and can then import and sync a list of alert words based on local, national, and worldwide events currently occurring, enabling the trending alert words set to be tailored to the present day. As such, trending alert words are helpful to users when something is happening that is sensitive, and the user is not even aware of the news event. In such instances, upon attempting to use a trending alert word within a message or social media post, the user is alerted (just as with user-curated alert words or employer-curated alert words) with a pop-up dialog (145). However, given that the user may not be aware of the rationale behind the alert, the user is provided the option to expand the pop-up dialog, which then provides an explanation (175) as to why the user may not wish to send the message or submit the social media post, as shown in FIG. 33. The explanation may include a link to a current news story to further explain the situation prompting the inclusion of the word in the trending alert words list. Alternately, the explanation may simply be ported from the news story itself, and textually depicted within the pop-up dialog (145) as shown in FIG. 33.

The trending alert words list is preferably curated in part according to the geographical location of the user, which is preferably accomplished via geolocation of the user's triangulated network location and/or GPS fix as provided by the hardware of the communication device (100) of the user.

The trending alert words list is configured to be constantly updating, and is automatically synced (pushed) to the communication device of the user via the application (101). The user may select when and at what interval the trending alert words list is conveyed to the application (101) if desired—otherwise, the trending alert words list will update automatically as updates become available. The trending alert words list is preferably synced directly from servers in communication with the application (101) of the present invention. The mechanism by which the trending alert words list is updated is preferably a skimming program employing an algorithm configured to scan high profile news stories from a variety of news sources, and scrape off terms to be designated as trending alert words. Additionally, there may be a human element involved in the curation of the trending alert words list to verify the accuracy of the algorithm.

The skimming program is preferably configured to scrape applicable news articles based on geolocation. If the user opts-in to global/national events, the trending alert words list is broadened to include words relevant on a global and national scale. This is pertinent for social media posts, as those are the most prone to being viewed by a global audience. Users are preferably provided the option to manually parse the list to decide independently what is relevant. Alternately, the user may select 'all' as a generality so that all of the trending alert words apply.

It should be understood that the employer-curated alert words are manually curated by the employer of the user. In such instances, the present invention functions as a SaaS (Service as a Software) solution by which employers contributed to a subscription model for their employees to all have the system of the present invention installed on their communication devices with the intention of preventing gaffes and corporate embarrassment. As such, administrators, on behalf of (and likely employed by) the employer may manually curate their respective list of employer-curated alert words. Similarly, such administrators may themselves receive alerts via the system of the present invention regarding questionable posts and messages being sent by employees so that the staff may have the final say or approval on certain transmissions.

Figure 34:
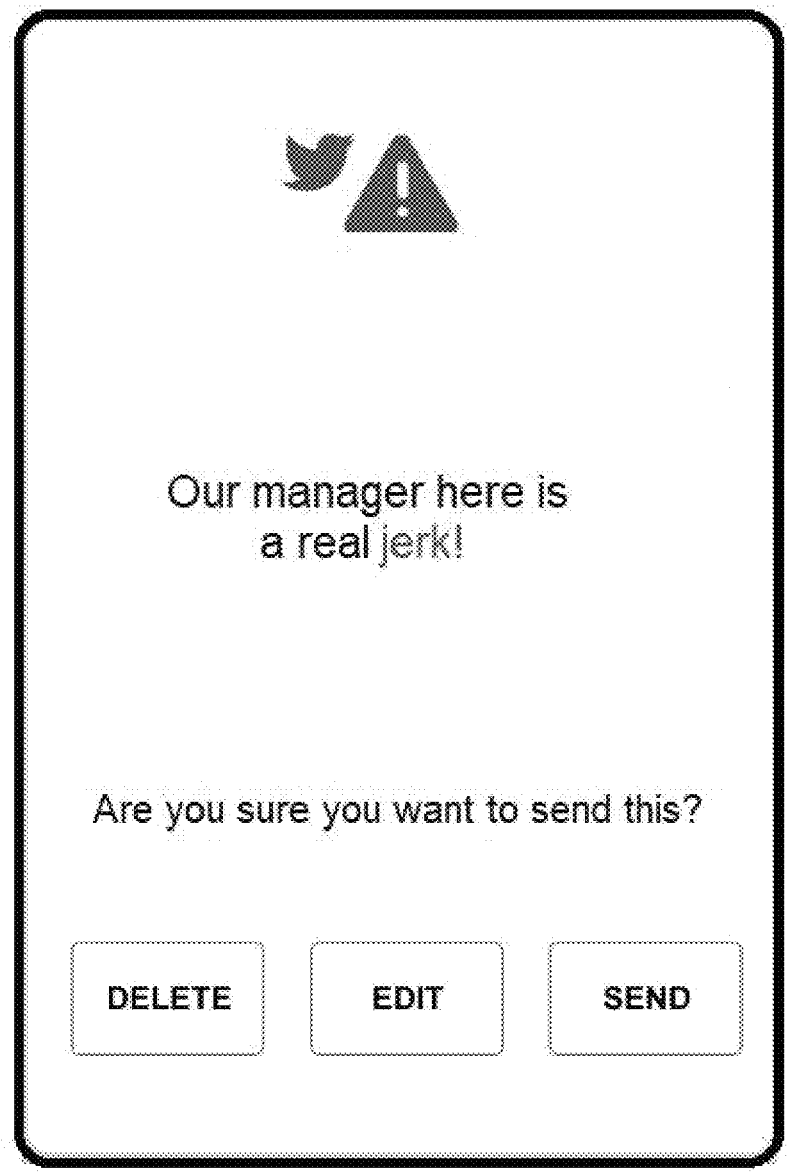
FIG. 34 presents a view of a standard alert pop-up dialog triggered by an employer-curated or user-curated alert word.
Figure 35:
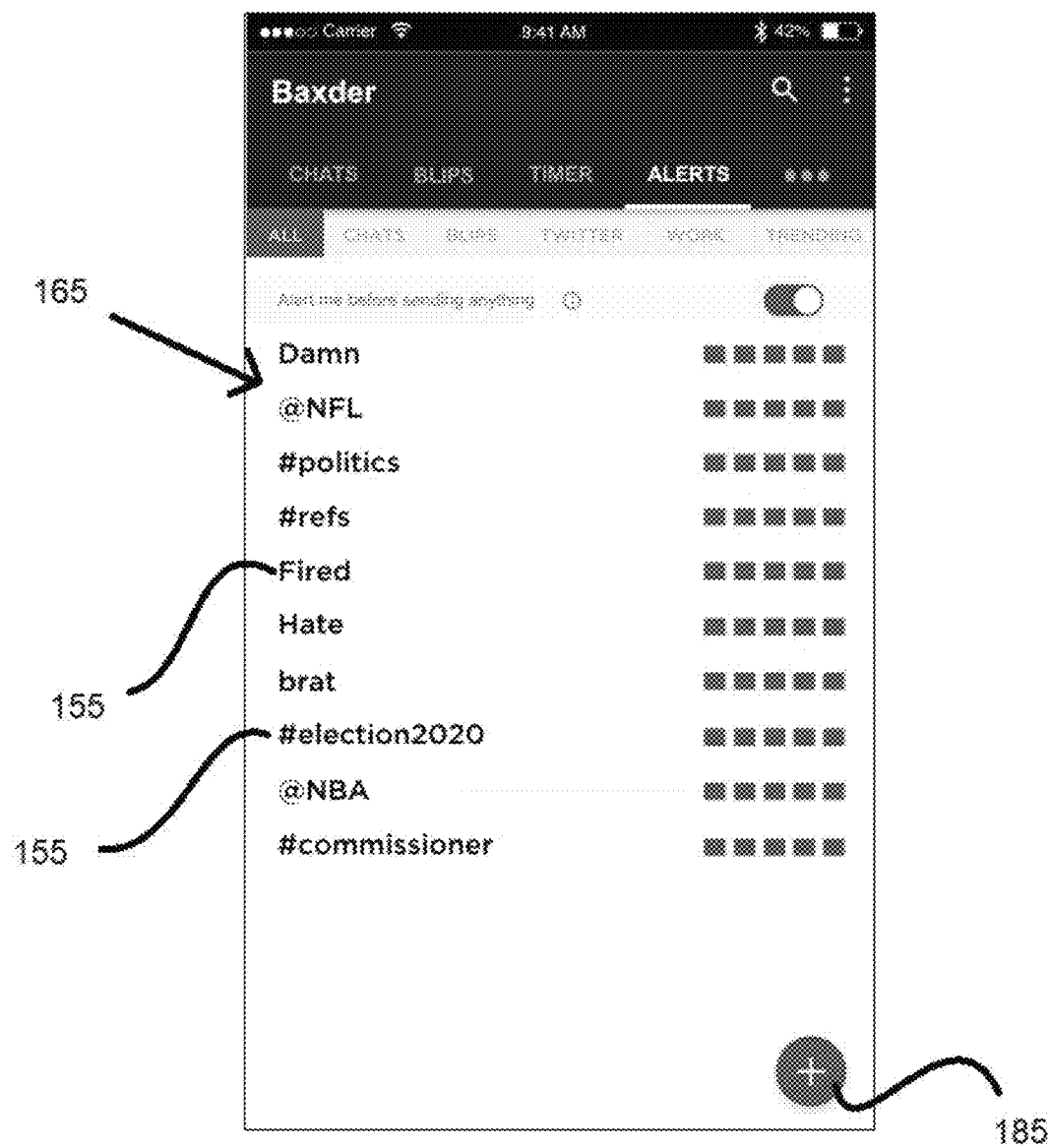
FIG. 35 details a view of the 'ALL' alerts screen, showing all alert words currently in use for the user.

Additionally, it should be understood that the alert words feature of the present invention is configured to be useful within any and all text-based communications achievable via the communication device (100) of the user. As such, alert word detection is made available to other applications and services via plugins and/or APIs where applicable. For example, if the user wishes to write a post to a forum within a dedicated forum application, such as the Reddit™ application, or to a message board via a browser of the communication device (100), the alert words feature of the present invention may be configured to alert the user if a defined alert word (155) is detected within the written post. Just as within the application (101) of the present invention, upon detection of an alert word (155) within the forum post or message board post, the present invention displays a pop-up dialog (or similar indicator) as shown in FIG. 34, alerting the user to the use of one or more alert words (155) within the post, and providing the user the option to edit the forum or message board post before publicly posting the message to the internet, delete, or send as-is.

Similarly, alert words (155) may be employed by the user for any and all social media posts, both from within their respective applications (via one or more APIs) or the browser. Additionally, the application (101) itself of the present invention is preferably equipped with social media integration. As such, users may navigate to a 'Post to Facebook™' section, in which users may craft a message to be posted to the social media network Facebook while within the application (101), enabling users to take advantage of the features of the present invention, such as alert words, for crafting publicly accessible online posts. Posting to Facebook™ should be understood to be an example, and the system of the present invention may facilitate posts to any and all social media networks capable of providing an API.

Additionally, users may activate a universal alert setting which issues an alert prior to the message transmission and/or post submission of any statement. The universal alert setting forces the user to review each message and post via a blanket alert pop-up dialog, even if no alert words are present within the message or post. The universal alert setting may be activated for each plug-in application. For example, a user may wish to activate the universal alert setting for Twitter™, but leave the option disabled for messages and Facebook™ posts.

Another aspect of the alert words control (120) of the present invention is the capacity to scan and analyze text written by the user and compare the text against an alert words list (165) which is crafted as a positive or 'whitelisted' list. There are many scenarios in which a user may not be aware of certain items of news related to a specific region, such as while traveling in an unfamiliar place. In such cases, the system and application (101) of the present invention is preferably configured to posit positive word suggestions for text-based messages and posts which adhere to the cultural norms of the time and place in which the user is located. As previously stated, alert words (155) are words (or words from events) that may be harmful to oneself or others if used in a message or post. To balance this, upon the system of the present invention identifying a potentially suspect word or phrase based on one or more alert words lists, the system can be configured to posit replacement words and/or phrases which are derived from positive stories/events. The positing of such positive, alternative words and/or phrases (preferably based on the news, history, and cultural norms of the current place and time) are configured to help the user present himself or herself in a better, more knowledgeable and culturally sensitive light.

The positing of alternate, positive words and/or phrases via a whitelist of alert words (155) are useful in many instances, including but not limited to:

Making the user aware of non-profit or community-based initiatives that result in positive outcomes which have been reported in the news, but are often buried (or otherwise difficult to find as a headline) since negative news is reported on more often.

If the user is a recently released prisoner who is re-entering society for the first time in many years, he or she may not be aware of positive progress (including new anti-discriminatory laws, etc.) which are now a part of his/her culture outside of prison. The application may then be configured to alert the user to these new (to the released prisoner) positive progressions present in his/her location. In such cases, the positive suggestions work in tandem with the negative alert words (155) blacklist to make the user's communication even more powerful and positive as he/she re-integrates into society.

If the user is a victim of human trafficking, positing of positive words and/or phrases can help the user to grow trust, awareness, and self-respect by understanding right from wrong again. It is known that one's mind is very sensitive and susceptive after being kidnapped, sold, and forced into a world of violation and abuse. Therefore, choosing the correct terms while communicating can prevent further alienation of the user from friends and family.

Professionals (such as professional athletes and corporate professionals) that travel or conduct international/interstate business can also be made aware of positive events in a chosen location so that they can mention them in public or private communication via the positive whitelist terms. The mentioning of such positive events (i.e. local news, stories, terms, policies, etc.) helps to increase the user's worldly view, outreach, and profile in the eyes of others, facilitating professional conduct via networking and commerce.

Businesses may employ positive words to facilitate a better realm of productivity, motivation, and to provide an overall setting for respectful communication. The application of the present invention positing positive words as suggestions to choose from allows for a new way of business in a world where disrespect (even accidental) is always but a click away, and can fault an entire deal, sale, or transaction.

Similarly, a congregation can employ positive news and initiatives relating to the religious institution to encourage communication pertaining to the church and current church activities.

Likewise, the user may be made aware, via the positive words suggestion feature, of community outreach projects occurring at and around the user's location which may be used in conversation to prove knowledge of positive ongoing and current events in conversation, helping to create a bond with the community.

The use of the positive words suggestion feature of the system of the present invention, issued and present via a positive alert words whitelist, preferably functions similarly to the aforementioned alert words mechanism of the present invention. Lists of words (and/or phrases) related to suggested subjects or events by location, employer, etc, are curated and/or aggregated into a database. Then, the positive words can come into play in one of two ways: the user may be prompted, after the creation of a message, by the application asking of the user wishes to reference a contextually relevant positive term relating to a user-selected geographical location (such as selecting the location of the recipient of the text-based post or message) such as those outlined above; or, the user may manually refer to the positive words list and choose words they deep appropriate in accordance with the message or post he or she is forming.

As with the negative alert words list (165) of the present invention, when the user sends or posts a message with one of the words found in the positive whitelist of words (or a corollary term which is contextually similar), the system of the present invention will prompt the user with the options to edit, delete, or send the message as written. In such instances, the word which triggers the prompt (indicator, pop-up dialog (145), or other notifier) is highlighted within the message text. The user is then able to tap on the highlighted word, instructing the system of the present invention to retrieve a definition and explanation as to why the highlighted word is in his/her list.

The blip control (130) feature of the present invention enables users to generate a one-time, self-destructing message that expires within a user-selected time period. For example, a message sent via the blip control (130) is preferably configured to expire one to nine seconds after the message is viewed by the recipient. The user can also send images, voice, text, location, contacts, maps, or other data via the blip control (130). Once the blip has expired, it is permanently deleted from the receiving device, and any intervening devices (including the transmission server), thereby becoming permanently deleted. Any data that was included in the blip, including images, video, voice, or other data is also removed from the receiving device at the time of expiration.

Unlike similar expiring messages disclosed in the prior art, the blips of the present invention afford the user great control over blip messages post-transmission. Similar to non-expiring messages sent via the present invention, blip messages may also be deleted and/or edited, even after they have been sent to the recipient, as long as the recipient has yet to view the blip message. Additionally, unlike expiring messages of the prior art, screenshots are permanently disabled within the application (101) of the present invention, which eliminates the potential for the recipient to permanently save and/or share the blip message without permission. While some instances of the prior art enable the deletion of a message, such as WhatsApp™, the period of deletion is limited to seven minutes. This is in contrast to the present invention, which has no limit on the period of deletion.

However, also contrary to messaging services of the prior art, a recipient of a blip message may request permission to save the blip message by petitioning the sender via the application (101). The application (101) refers to saved blip messages as 'stickits'. Upon receiving a blip, the recipient may select 'request stickit,' an option preferably provided at the bottom of the blip message. Upon selection of 'request stickit,' a request is sent to the sender of the blip, informing the sender of the recipient's desire to save the message. During this time, the blip message is preferably grayed out on the recipient's device, stating 'stickit pending.' The blip message preferably remains in the recipient's inbox, but may not be viewed again until permission is granted. The sender may opt to grant the recipient's request, at which point the recipient may save the blip message to the internal memory of his/her device. Alternatively, the sender may opt to decline the stickit request of the recipient, at which point the status of 'stickit pending' on the device of the recipient is changed to state 'stickit denied.' In short, if the sender provides permission, the present invention allows the recipient to save the message easily within the application to device memory or cloud storage, without the use of a screenshot. If permission is not obtained from the sender, the message expires and is deleted permanently from all devices. In some embodiments of the present invention, the sender may revoke permission—even after it is granted. In such scenarios, the saved stickit is deleted from the recipient's device with or without notification to the recipient.

The timer control (140) of the present invention can work in concordance with communications, such as those generated by the messaging control (110), alert words control (120), or blip control (130), to send a communication at a specified time in the future. In some aspects, the timer control (140) can notify a user when a message is close to being sent, such as within one hour. The timer control (140) notifies and illustrates to the user when a message will be sent—from years into the future, down to one second—which is shown for each individual message that is pending in the timer queue.

Figure 2B:
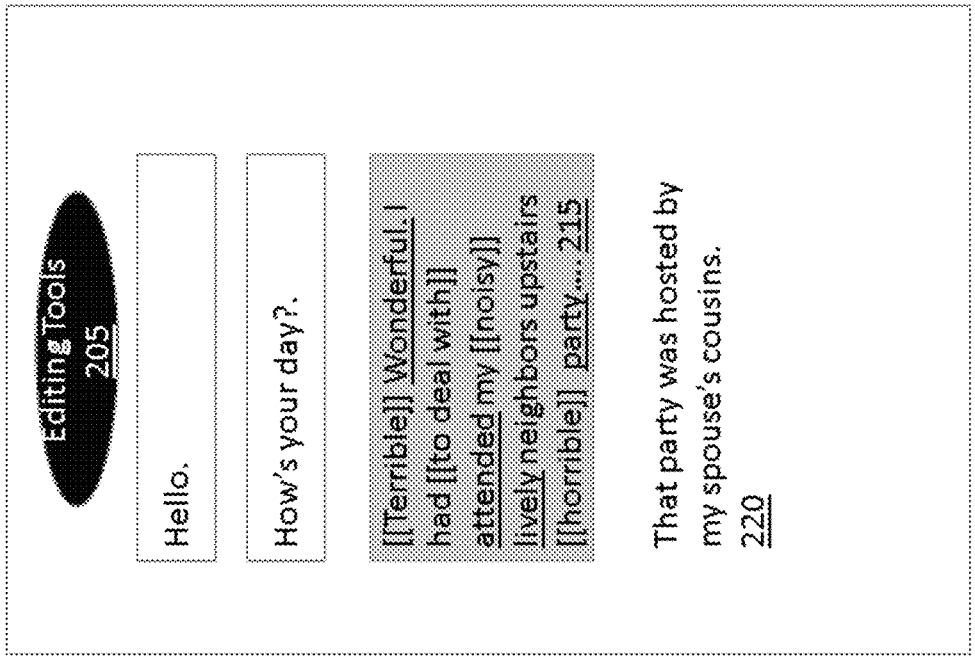
FIG. 2B illustrates a second stage of an example screen interface of the message control of the present invention, showing edits made post-transmission.
Figure 2A:
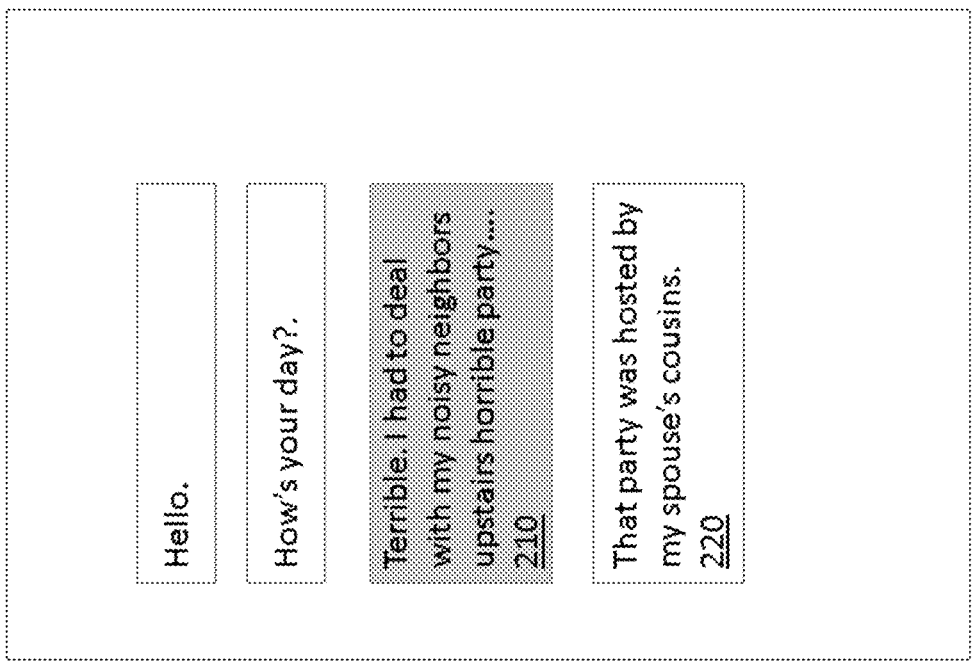
FIG. 2A illustrates a first stage of an example screen interface of the message control of the present invention.

FIG. 2A illustrates an example communication in a screen interface of the app (101) of the present invention that a user might be shown on the screen of the communication device within the messaging control (110). As is illustrated, there is an unfortunate social gaffe made in message balloon (210). The response to the social gaffe is made by the other party in message balloon (220).

In FIG. 2B, the user, realizing that he has made a social gaffe, taps on the message balloon (210), thereby invoking editing tools (205). Editing tools (205) enable the user to edit the message, as is illustrated in message balloon (215).

Figure 2C:
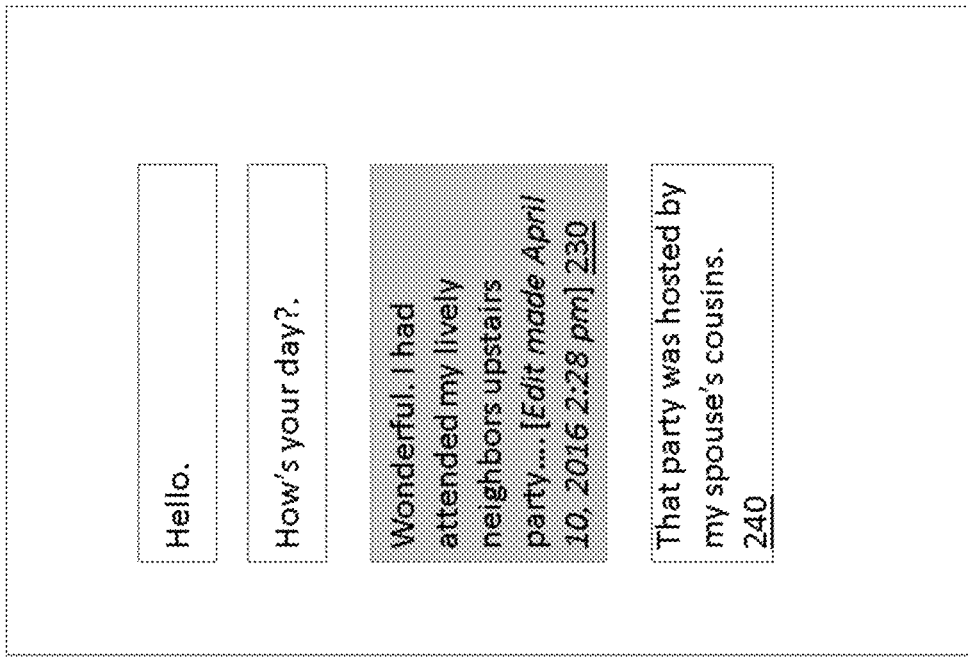
FIG. 2C illustrates a third stage of an example screen interface of the present invention, showing the edited message marked as 'edited.'

In FIG. 2C, a screen interface of the app (101) is shown in which the user enters the edited message balloon (215), which then becomes the message balloon (230), as is illustrated on both the sender's and receiver's communication devices. In some aspects, there is an indication of an edit of the message that had previously occurred in the conversation, such as here, wherein the application (101) displays a time at which the edit was made by the sender. In some further aspects, edit histories are available to either and/or both parties to the communications.

Selecting individual message balloons allows for editing of individual text or other messages as part of an ongoing conversation. This is unlike prior technologies, wherein at best users might be able to delete an entire conversation, but does not allow for editing of individual messages within a conversation, especially post-transmission. This advantageously allows for flexibility and control, even after the transmission of and reading, or not reading, of messages.

Figure 3B:
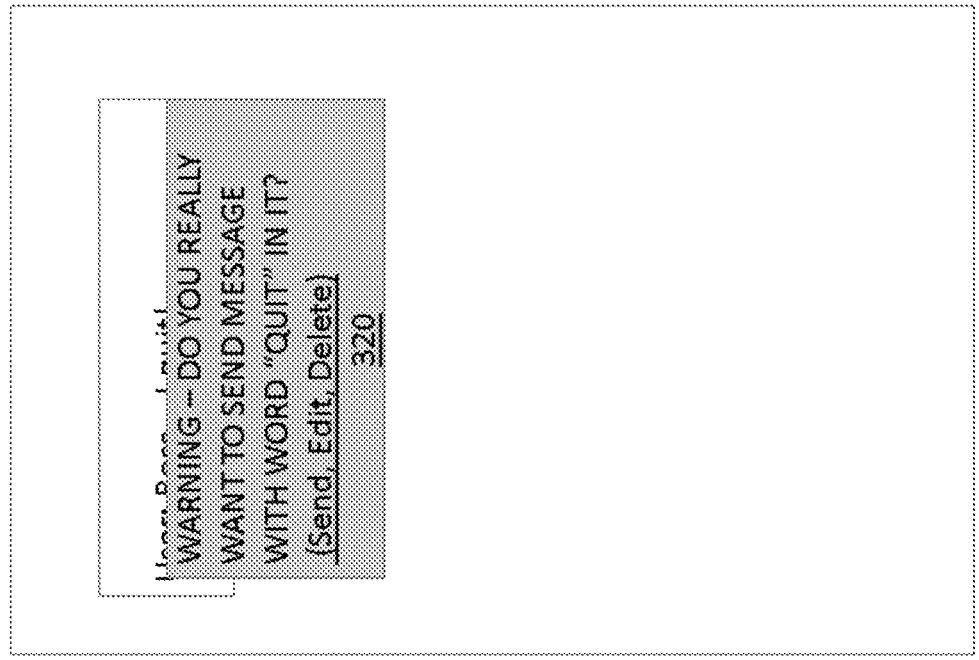
FIG. 3B illustrates a stage of an example screen interface of the alert words control of the present invention.
Figure 3A:
FIG. 3A illustrates a stage of an example screen interface of the alert words control of the present invention.

FIG. 3A illustrates an example screen interface of the app (101) that is employed by the alert words control (120), wherein a user in a fit of pique sends a message to his purportedly abusive supervisor. Specifically, the words: "I quit." In messaging platforms of the prior art, such a messaging containing the words "I quit" would have been sent, and that could very well spell the demise of what had been, up to that point, a stellar career.

The alert word control (120) of the present invention detects selected words or phrases that could be detrimental to a user, such as by scanning an alert word registry or 'black list.' In the illustrated example, one of these alert words is "quit." Therefore, in FIG. 3B, an alert screen (320) sends a warning to a user, asking if the user truly wants to send a message with the word "quit" in it. The user can then be presented with selecting from one of three options: send, edit, or delete.

In a further aspect, the alert word control (120) is programmed, either by a user or remotely, such as by a remote server, to further recognize trending words, and to enter them into the alert word registry automatically.

In a yet further aspect, multiple users can share at least in part a shared registry of alert words. This can be especially useful in a corporate environment, wherein multiple users are working within the same company.

Figure 4B:
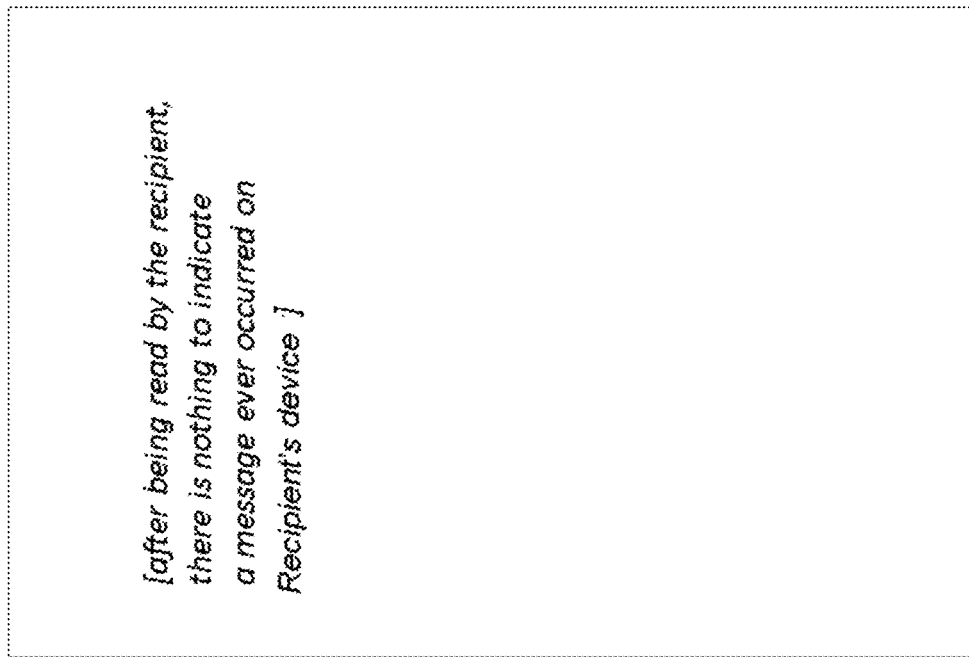
FIG. 4B illustrates a stage of an example screen interfaces of the blip control of the present invention.
Figure 4A:
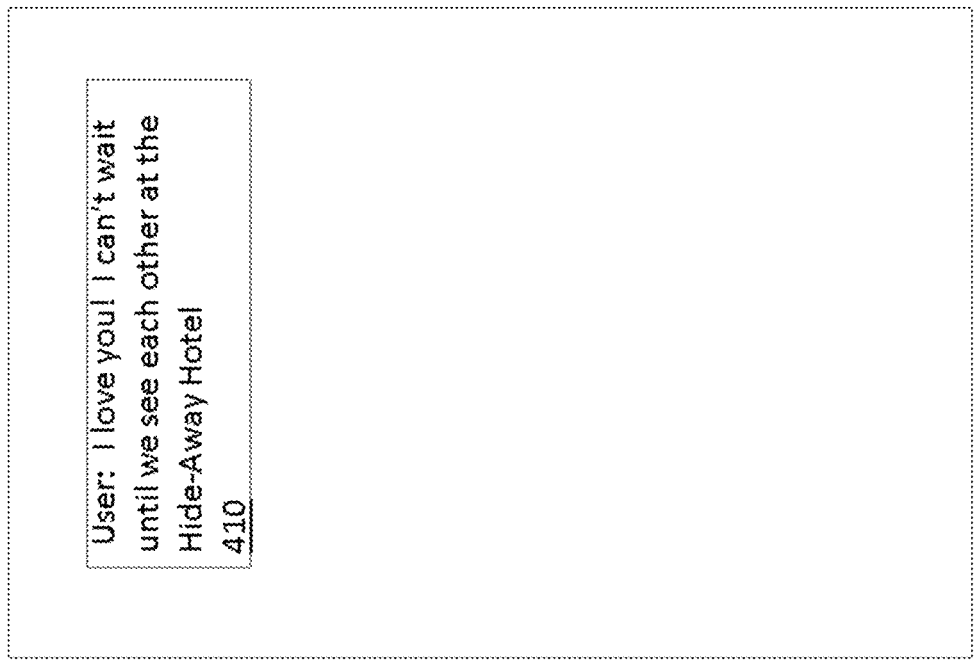
FIG. 4A illustrates a stage of an example screen interfaces of the blip control of the present invention.

FIG. 4A illustrates an example of a screen interface of the app (101) of the present invention pertaining to a user employing the blip control (130), wherein the user sends a message (410), that for whatever reason, the user would prefer that there to be no permanent record that the message was sent nor received.

In FIG. 4B, as is illustrated, after being read by the recipient, the blip is deleted from the receiver communications device at the command of the blip control (130), and moreover, the blip message is itself deleted from any intervening servers. In one aspect, the receiving device informs an intermediate server that the message has been read or acknowledged, upon which the intervening server deletes the mention and content of the blip message. In one example, the blip disappears five seconds after being read. The expiration or 'read time' of the blip is preferably specified by the user sending the blip.

Figure 5B:
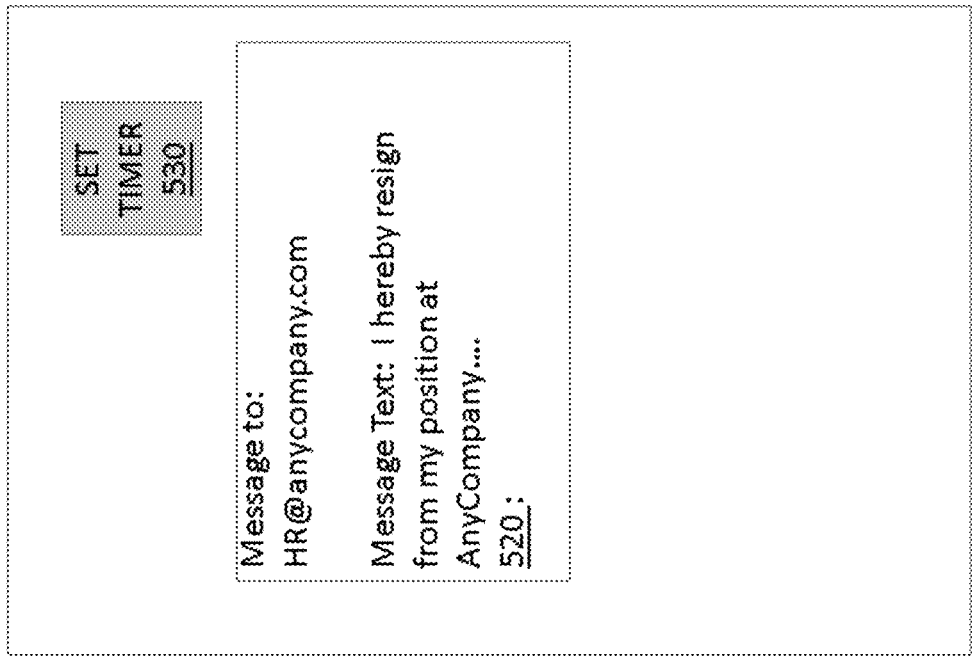
FIG. 5B illustrates a second stage of an example screen interface of the timer control of the present invention.
Figure 5A:
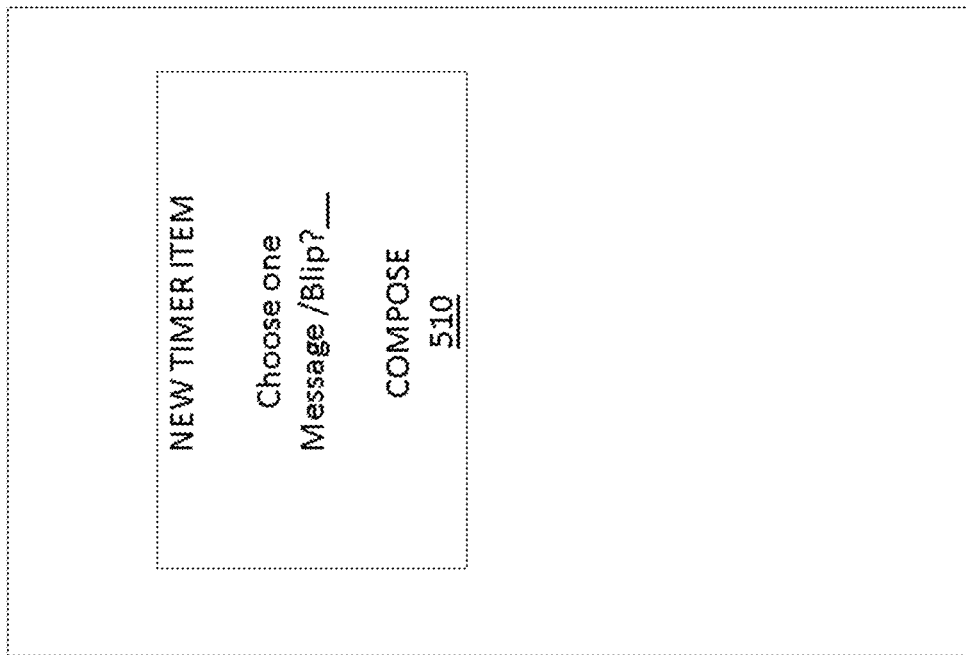
FIG. 5A illustrates a first stage of an example screen interface of the timer control of the present invention.

FIG. 5A illustrates a screen interface (510) of the app (101), generated by the timer control (140), wherein a selection box is presented to a user, wherein either a message or a blip is selected, and then a compose button is selected.

FIG. 5B illustrates a next screen interface generated by the timer control (140), wherein a user, perhaps again in a fit of pique, writes to his HR department at AnyCompany, that "I hereby resign . . . ." in a message (520). Once this is drafted, he then selects a set time (530). The set timer (530) invokes the next interface.

Figure 5D:
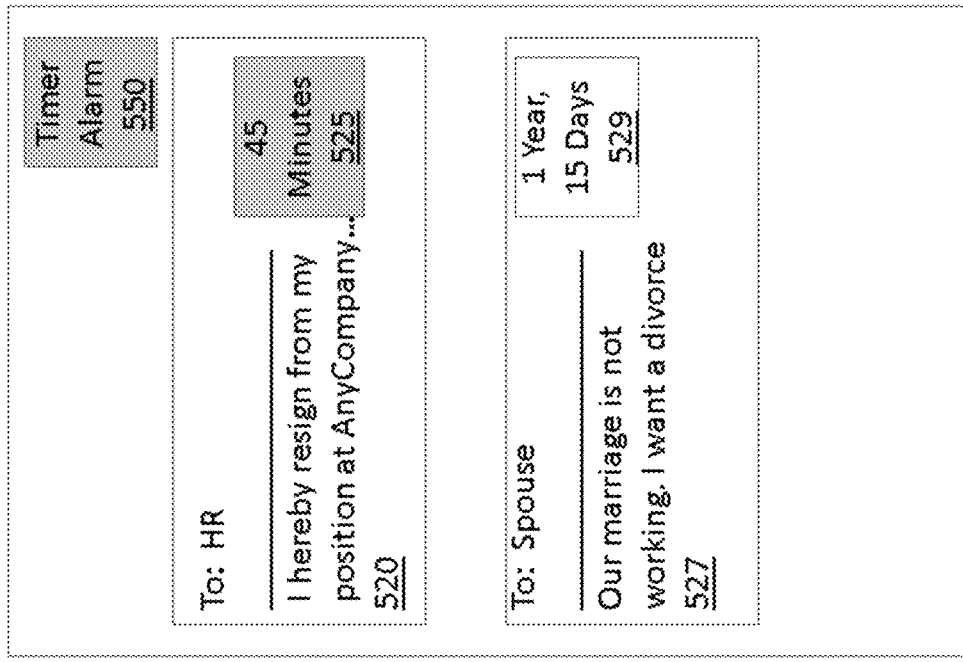
FIG. 5D illustrates a fourth stage of an example screen interface of the timer control of the present invention.
Figure 5C:
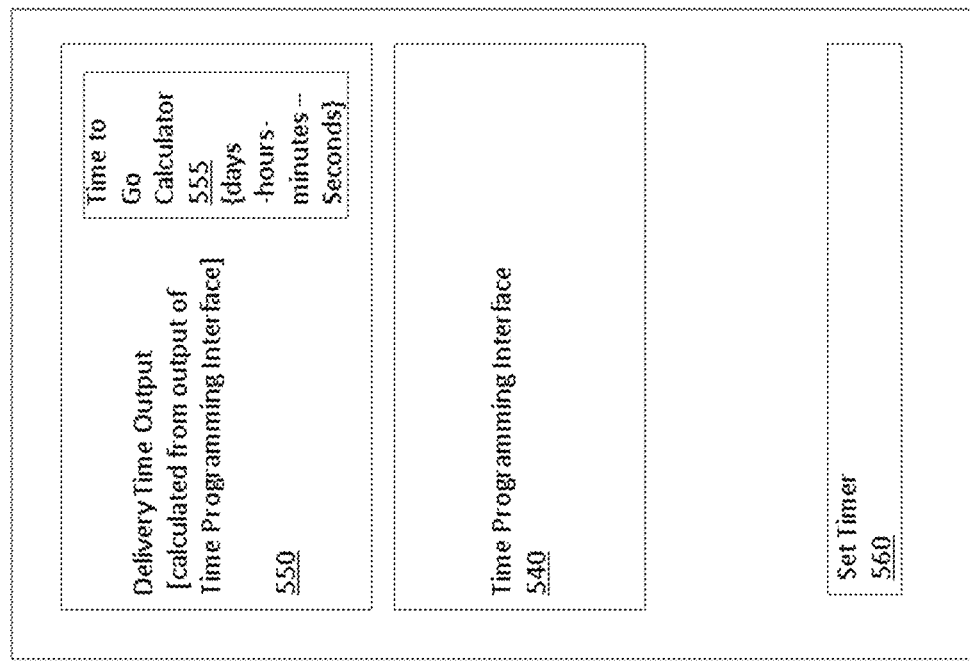
FIG. 5C illustrates a third stage of an example screen interface of the timer control of the present invention.

FIG. 5C illustrates an example next screen interface generated by the timer control (140) of the present invention, wherein a time programming interface (540) can accept a user-selected time to send out a time delayed message. Whatever time is indicated by the time programming interface (540), before being set by a set time (560), is illustrated on delivery time output (550). In some further aspects, this will include a time-to-go calculator (555).

FIG. 5D illustrates a screen interface employing the timer control (140) having the message (520). As illustrated, there is a countdown control (525) associated with the message (520). The countdown control (525) informs a user how long until a message will be sent by the timer control (140) of the device (100) to the selected recipient, in this illustrated example, HR of AnyCompany.

FIG. 5D further illustrates a second example message (527) that is stored for later conveyance by the control timer (140). In this example message (527), a countdown control (529) says that the example message (527) will be sent at a certain time period, in this case, one year, 15 days.

In some further aspects, the timer control (215) has a timer alarm (550). The timer alarm (150) denotes the length of time until a next pending message is sent by the timer control (140). In some aspects, the timer alarm (140) has three states: a first state if a first pending message is to be sent within 59 minutes to five minutes; a second state if the first pending message is to be sent within a time equal to or lesser than four minutes and 59 seconds; and a third state if the first pending message is to be sent after one hour or more. In all further aspects, if the message is to be sent within an hour, the timer alarm (550) will alert the user that a message is due to be sent within the hour on a main interface of the device (100). It should be noted that the next timer message to be sent is always displayed on a main interface of the device (100), regardless of how much time remains until the message is to be sent. Therefore, the state of the most recent timed message to be sent is listed on the main interface.

Additionally, the timer control (140) of the present invention is preferably capable of interfacing with a calendar of the user, such as Google™ Calendar, Microsoft™ Outlook™, or other known digital calendars. In such instances, after a timed message has been set via the timer interface (140), a calendar entry is added to the calendar of the user that denotes the date and time at which the timed message is set to be transmitted to the recipient. This feature of the present invention may be optionally activated at the will of the user, preferably from within the timer control (140) of the application (101). Timer to calendar integration is preferably accomplished via APIs corresponding to the respective calendar, such as Google Calendar API, Outlook REST API, etc.

Similarly, further calendar integration is preferably provided by the system of the present invention, namely automatic calendar appointment generation based on the presence of a date format (i.e. 'MM/DD/YY,' 'DD/MM/YY,' 'MM/DD/YYYY,' 'Month, Day, Year,' '00:00 time' etc.) within a message or blip. For example, if a user receives a message containing a known date format, the application (101) is preferably configured to prompt the user with a dialog box asking the user if he/she wishes to add the date to his or her calendar as an appointment. If the user selects 'yes,' a calendar API is employed to automatically begin a new calendar entry for the date and time indicated within the message. Preferably, the user is then redirected to the calendar application, which then displays the new calendar entry in progress, prepopulated with the date and time fields from the received message. The user may then add additional details to the calendar entry, such as a title and/or notes. Upon saving the calendar entry, the user is then preferably redirected to the application (101). Optionally, this feature may be enabled to create a new calendar entry automatically, without prompting, in alternate embodiments of the present invention.

FIG. 5E illustrates a further example of a time programming interface (540) of the cell phone app (101) of the preferred embodiment of the present invention. In some further aspects, before entering information into the time programming interface (540), a user first conveys if the message is to be sent "today" or "another day."

FIG. 6A illustrates some example source code of the app to enable the messaging control (110), that of connecting between the application on the message control (110) and an application server. Generally, please note that the following code can represent code from different modules.

FIG. 6B illustrates some example source code of the app to enable the messaging control (110) to help properly index a given message balloon so it can be individually edited.

FIG. 6C illustrates some example source code of the app to enable the individually-editable message to be sent by the message control (110).

FIG. 6D through FIG. 6H illustrate some example code that defines the functionality of messages to help properly index a given message balloon so it can be individually edited when employing the message control (110).

FIG. 7A illustrates some example source code to be used by the alert word control (120) when presenting an alert word to a user FIG. 7B illustrates some example source code to be used by the alert word control (120) of the present invention when checking for an alert word.

FIG. 7C illustrates example source code for searching for alert words by the alert word control (120) of the present invention.

FIG. 7D illustrates some example source code to initiate blip time checking as employed by the blip control (130) of the present invention.

FIG. 7E illustrates some example source code to check individual blips for expiration as employed by the blip control (130) of the present invention.

FIG. 7F illustrates some example source code for updating an amount of time remaining for an individual blip and deleting when that time reaches zero, as employed by the blip control (130) of the present invention.

FIG. 7H illustrates an example of source code of the timer control (140), wherein a message is sent to a server, such as a PHP backend server, to create a timer message via the system of the present invention.

FIG. 7I illustrates an example of source code used to create an instance of a timer by the timer control (140) of the present invention.

Figure 8:
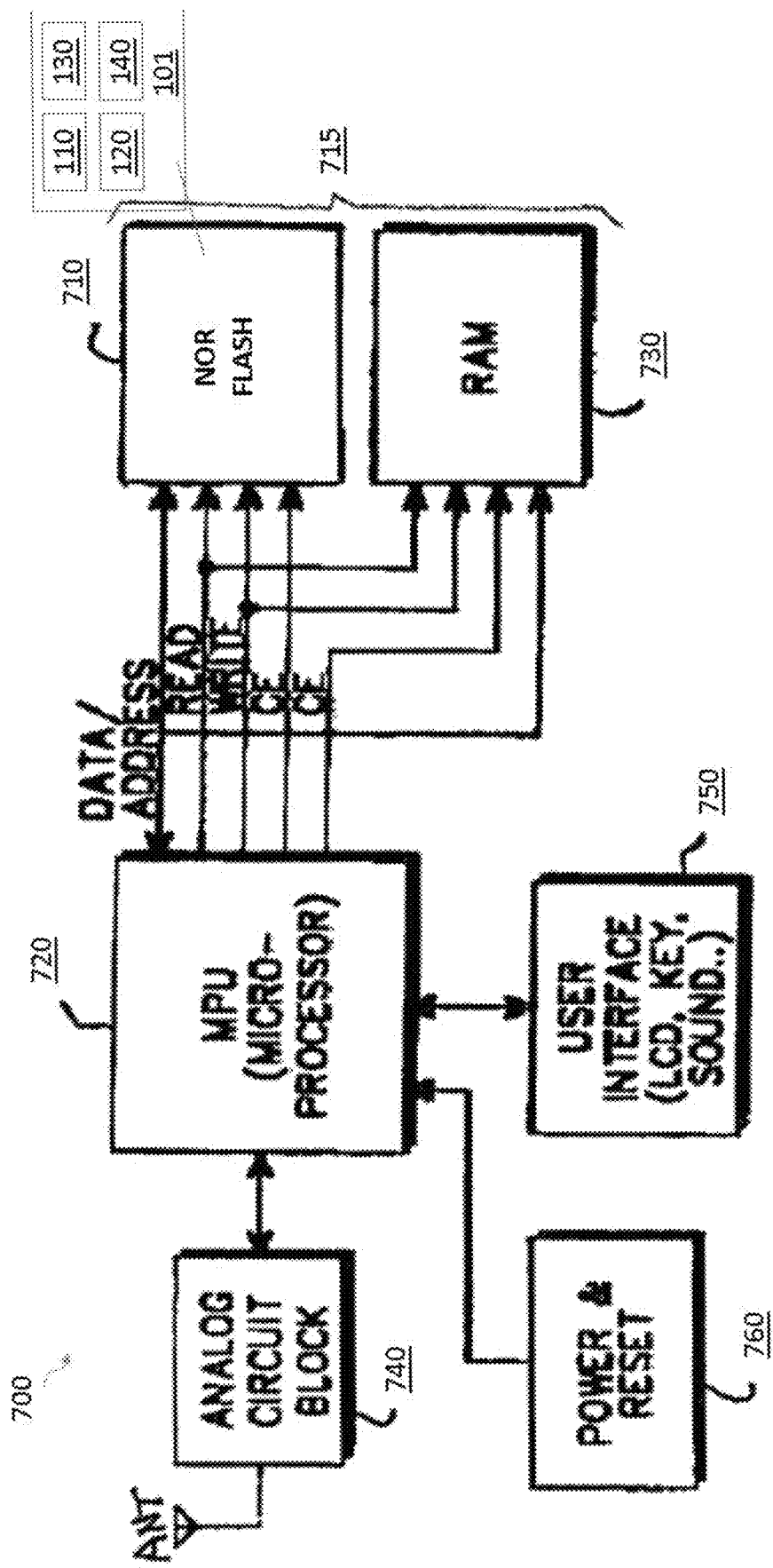
FIG. 8 illustrates an example of a cellular phone in which the messaging control, alert words control, blip control, and timer control of the cellular application can operate.

FIG. 8 illustrates an example block diagram (700) of a cell phone in which the app (101), such as illustrated as occurring on the device (100), can be used. However, other architectures may alternatively be used.

A microprocessor (MPU) (720) provides overall control to the operation of the communication device (100) by a control program stored in the memory device (715). An analog circuit (740) provides an air-interface to a mobile communication system via antenna ANT and a user-interface (750) provides an interface for a user through an LCD display, keypad, and microphone. A power and reset circuit (760) is provided to reset and initialize the MPU (720) and memory (715) upon start-up of the communication device (100). The memory device (715) preferably includes a NOR-type flash memory (710) for storing application programs and user data, and a Random Access Memory (RAM) for executing the programs.

The NOR-type flash memory (710) is attached to a microprocessor (MPU) (720) so that upon the communication device (100) resetting, the MPU (720) generates a dedicated reset vector address, reads a program code from the flash memory (710), and performs a program in the RAM (730) according to a program sequence. Moreover, all user data received through the air, via an antenna ANT, or downloaded from a PC (personal computer) could be stored in the NOR-type flash memory (710), being a non-volatile one to be available to a user when necessary. In FIG. 7, the permanent memory of the messaging control (110), the alert words control (120), the blips control (130), and the timer control (140), which were each flashed to the NOR flash (710), can have instances thereof residing in the RAM (730), to be processed by the MPU (720).

Figure 9:
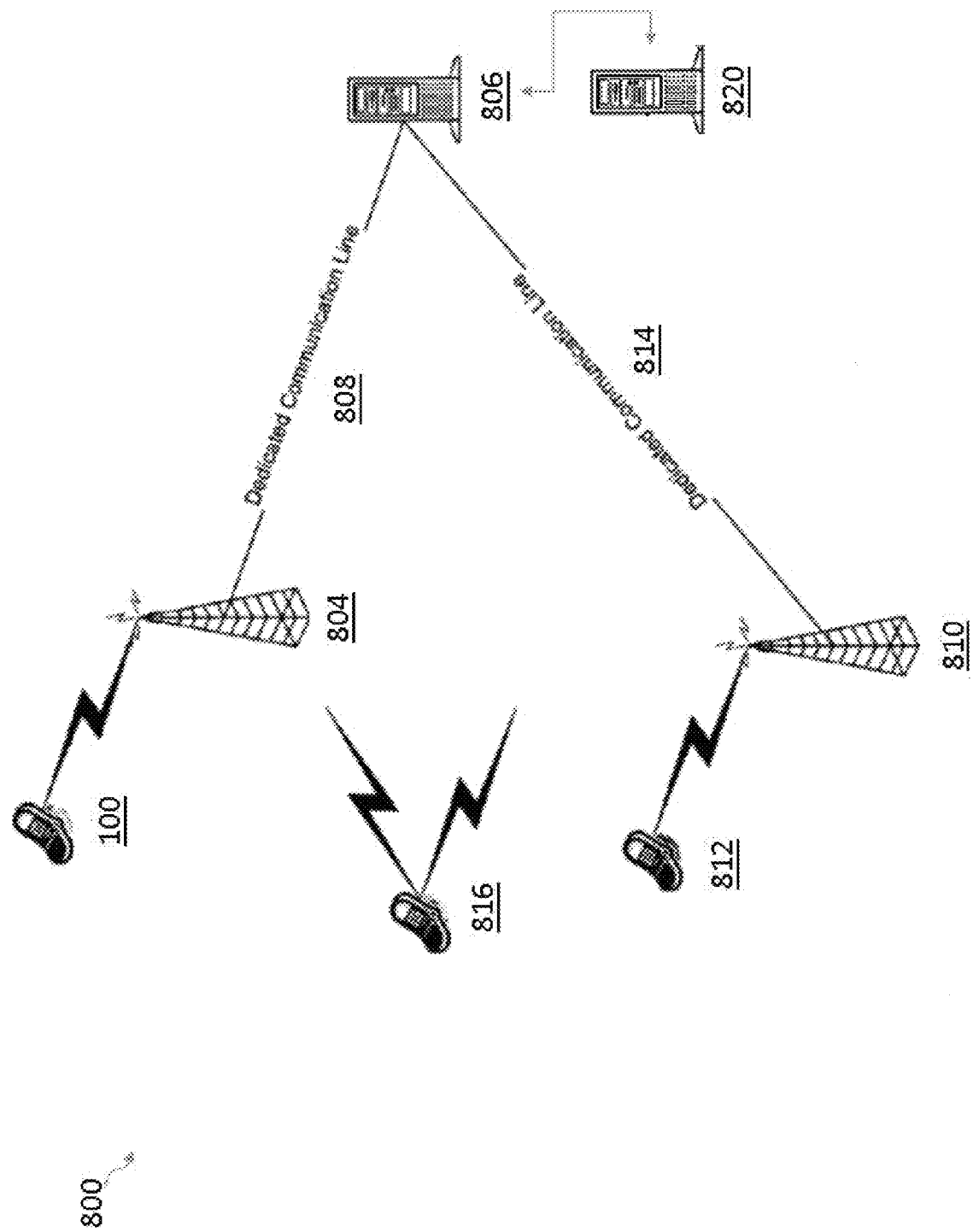
FIG. 9 illustrates an example of a system wherein the cellular phone can operate, wherein the cellular phone having the app, wherein the cellular phone application includes the messaging control, alert words control, blip control, and timer control.

FIG. 9 illustrates a system (800) displaying the overall structure of the system of the present invention, including the communication device (100) having the app (101), intermediate servers (805), and a receiving device (812), also having the app (101) (not illustrated). The communication device (100) is coupled via cell phone signals to a first tower (804). The first tower (804) has a dedicated communication line (808) to a cell provider phone switch (806) over a dedicated communication line (808). The cell provider phone switch (806) is further coupled over a dedicated communication line (814) to a second tower (810). The second tower (810) communicates with the receiving device (812). In the illustrated example, a third device, device (816), also including application (101), communicates with the first tower (804). Also, a PHP server (820) is coupled to the cell phone provider switch (806). The PHP server (820) enables at least the enablement of the control timer (140) as is illustrated with FIGS. 6Di-6Dii.

It should be understood that the server(s) in communication with the application (101) of the present invention are preferably configured to compress images, videos, and audio recordings transmitted via the system of the present invention. This compression is preferably achieved by transcoding and/or downscaling at the cost of quality, which is not generally noticeable to users when viewed via the display of the communication device (100). Bit rate and quantization parameters are preferably selected such that the quality degradation is not noticeable to users. The aspect ratio of videos and images is not altered due to compression, in order to preserve the user experience. Ideally, compression is provided via a GPU-optimized algorithm with multiple threading to achieve maximum expediency of message compression and transmission.

Generally, turning to FIGS. 10-30, illustrated are various stages of on example of a state diagram of interfaces for the app (101) of the present invention. Various states will be discussed with more particularity, and may also be discussed in relation to other FIGS of the present Application, and also the messaging control (110), alert words (120), blip control (130), and timer control (140) of the present invention. Please note that the terms 'interface' or 'screen' may be used interchangeably. Also, please note that certain screens may not be present in certain specific aspects. It should also be noted that some off-figure transitions are also to be deemed as coupled through matching letters. Please also note that an example state diagram (900) of FIG. 31 refers to the various interfaces illustrated of FIGS. 10-30, although other transitions are possible.

Figure 10:
FIG. 10 illustrates a transition of example entry interfaces of the app.

FIG. 10 illustrates introduction states to the app (101) of the present invention displayed on a state diagram (900) having an introduction screen (901) of the app (101). The introduction screen (901) transitions to a mobile number screen (902) and a verification screen (904) of the app (101), wherein a phone number is verified as shown in FIG. 10. In an initial profile screen (906), the profile of a user is generated. The user is prompted to supply the app (101) with a profile photo and screen name, as shown in profile screen (906). Then via profile verification (908), a profile verification screen is generated when after the profile generated in the initial profile screen (906) is being checked for errors. The state diagram (900) then transitions to screen (910) of FIG. 11.

Figure 11:
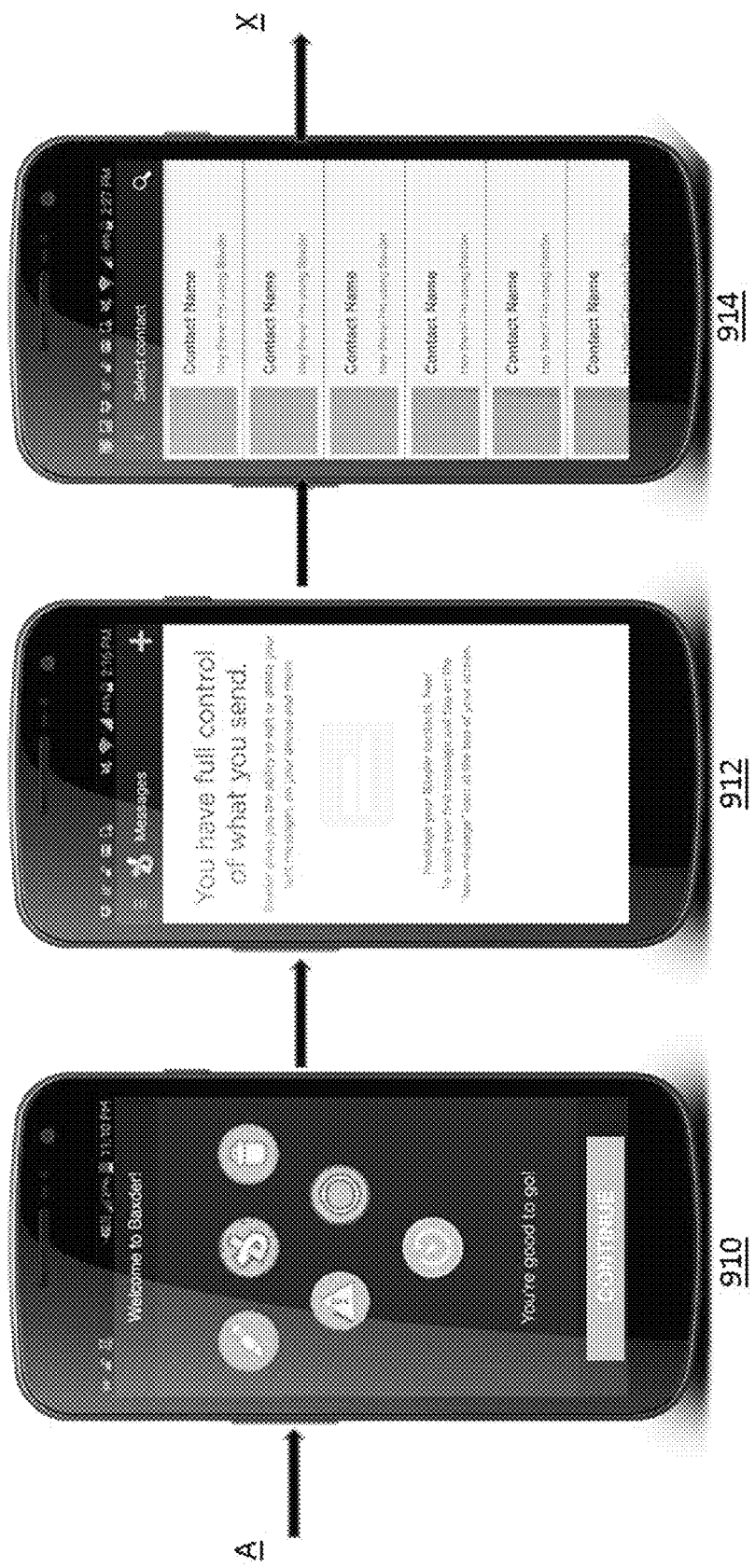
FIG. 11 illustrates further entry interfaces and a list of transition interfaces on the app 101.

FIG. 11 illustrates the verification complete screen (910) of the state machine (900), which illustrates that the verification of user input is complete. The verification complete screen (910) then transitions to a messaging introduction screen (912). Upon selection of this screen, the state diagram (900) of the app (101) then transitions to a list of contacts on list of contacts screen (914), and from there to screen (916) in FIG. 12.

Figure 12:
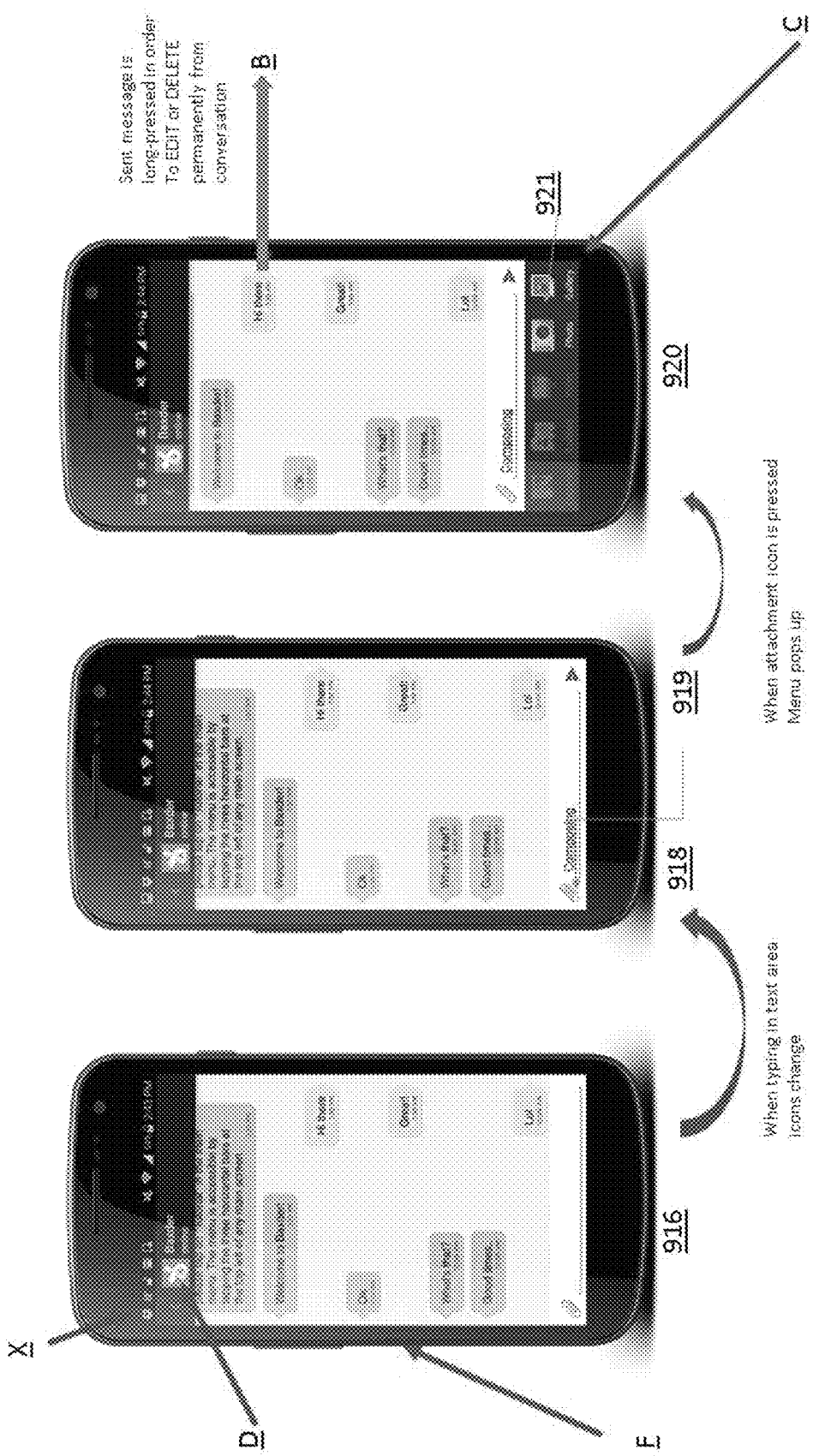
FIG. 12 illustrates example messaging within the messaging control.

In FIG. 12, the state machine (900) of FIG. 11 has transitioned from screen (914) to the first example of an ongoing conversation screen (916) of the messaging control (110). Please note that, in one aspect, these may be various values which could be stored within the NOR flash (710) of the example block diagram (700) of a cell phone.

FIG. 12 illustrates various aspects of ongoing conversations according to the messaging control (110) of the app (101). In the example screen (916), when typing begins, the screen transitions to a screen (918), wherein an editing area is shown to be active due to this typing. In a further aspect, should an attachment icon (919) be activated, an active area (921) of a message screen (920) is active.

Then, in FIG. 12, a transition can occur with either the message screen (920) or the message screen (919). The message screen (920) either transitions to screen (922) of FIG. 13 or to screen (926) of FIG. 14. However, in an alternative state diagram (not illustrated), the transitions instead occur from screen (918).

Figure 13:
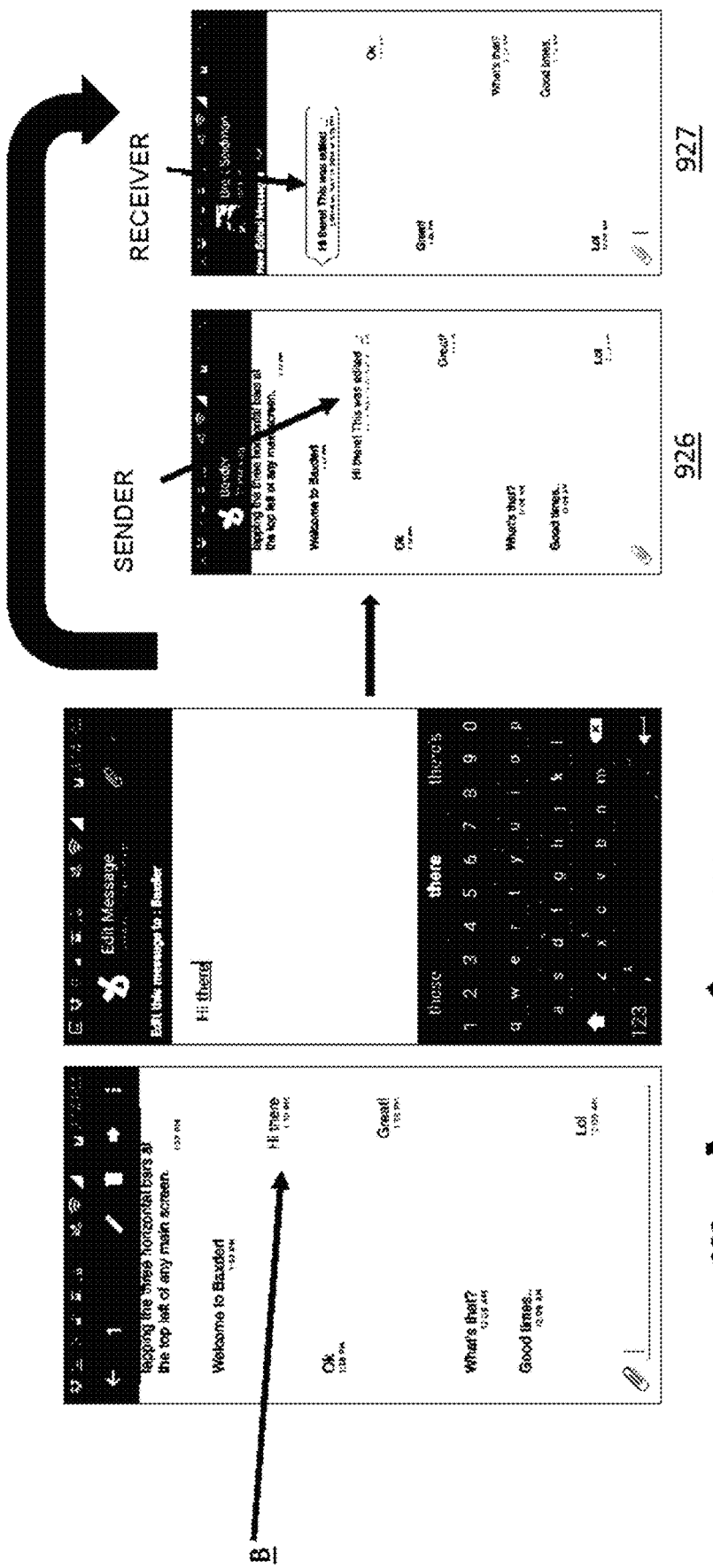
FIG. 13 illustrates editing and/or deleting messages within the messaging control.

FIG. 13 includes one example of an editing selection screen (922) of the messaging control (110), wherein a previously sent message is selected to be either deleted or edited. With employment of example code of FIGS. 6A, 6B and 6C, advantageously individual messages within message balloons can be edited instead of an entire conversation of related message balloons being deleted.

Editing selection screen (922) then transitions to a real time editing screen (924), wherein a former balloon message is shown (the "old message") and an edited balloon message is shown (the "new message".) This then transitions to an updated message screen (926), wherein an edited individual balloon message is shown on both the communicating mobiles (812), (816) of FIG. 9.

In FIG. 13, illustrated is what an edited message looks like in conversation on a receiver side in a sender screen (926), and what a conversation looks like on a receiver side in a receiver screen (927). Point B shows a message, 'Hi there' in the editing selection screen (922), on which the user may long-press on the sent message in order to edit or delete the message permanently from conversation on both devices. Note that in screen (926), the message has been edited to include an exclamation mark, and the message is marked as edited on both sender device, shown in screen (926), and the receiver device, shown in screen (927).

Figure 14:
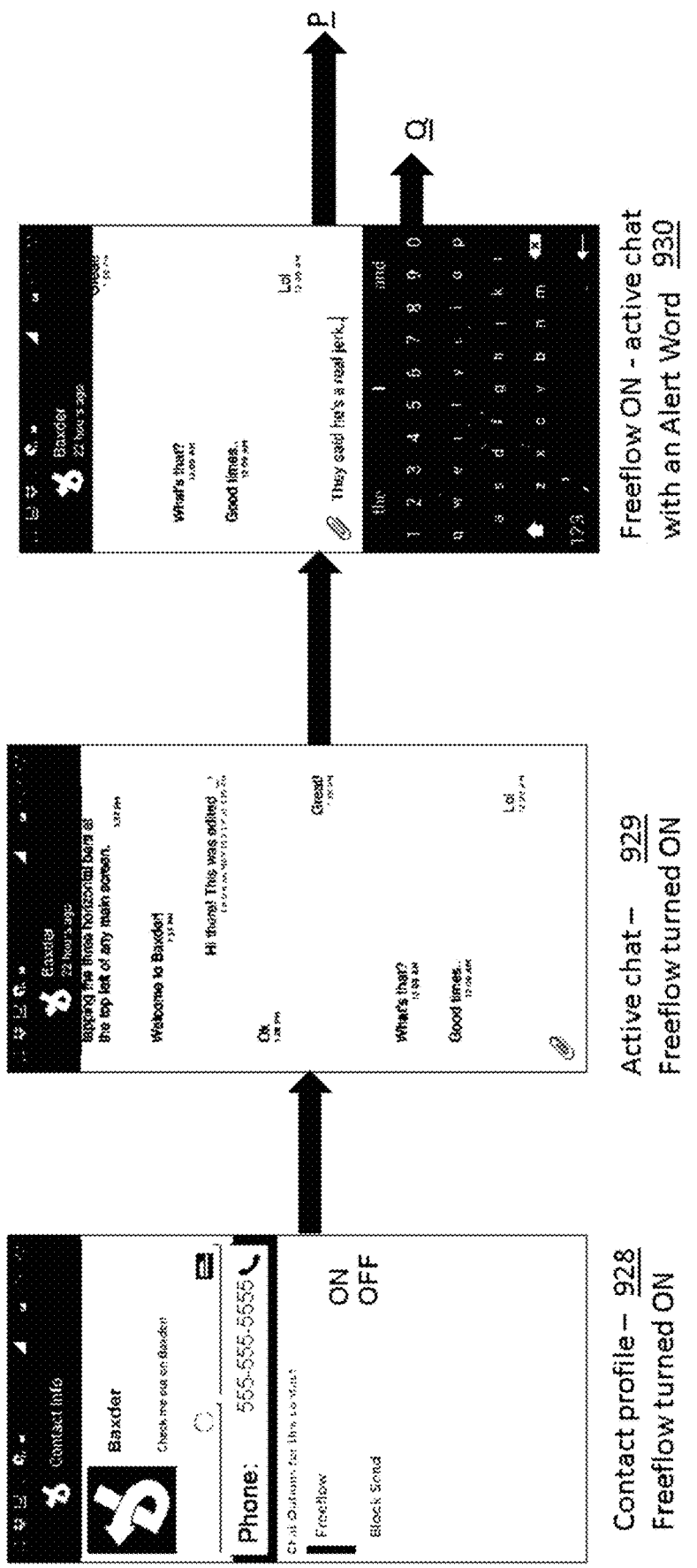
FIG. 14 illustrates example alert screens of the alert words control with freeflow control enabled.

FIG. 14 illustrates another example aspect of the app (101). From a contact profile/freeflow on state is invoked in freeflow turned on screen (928). This transitions to a freeflow turned on screen (929) of FIG. 14, which means that ongoing conversations can be monitored in real time. Moreover, alert words, such as 'jerk,' can also be monitored in freeflow active. With freeflow enabled, a user composing and sending a message will not receive an alert word warning before sending a message with an alert word in it, therefore allowing them to communicate uninterrupted by a warning and instead communicating with freeflow. Active chat screen (929) then transitions to an example screen (930) that has received an alert word when in its freeflow enabled aspect. Screen (930) then transitions to either screen (931) of FIG. 15 or screen (935) of FIG. 17. In effect, it should be understood that the freeflow feature of the present invention deactivates the alert words feature of the present invention for that specific conversation and/or contact.

Figure 15:
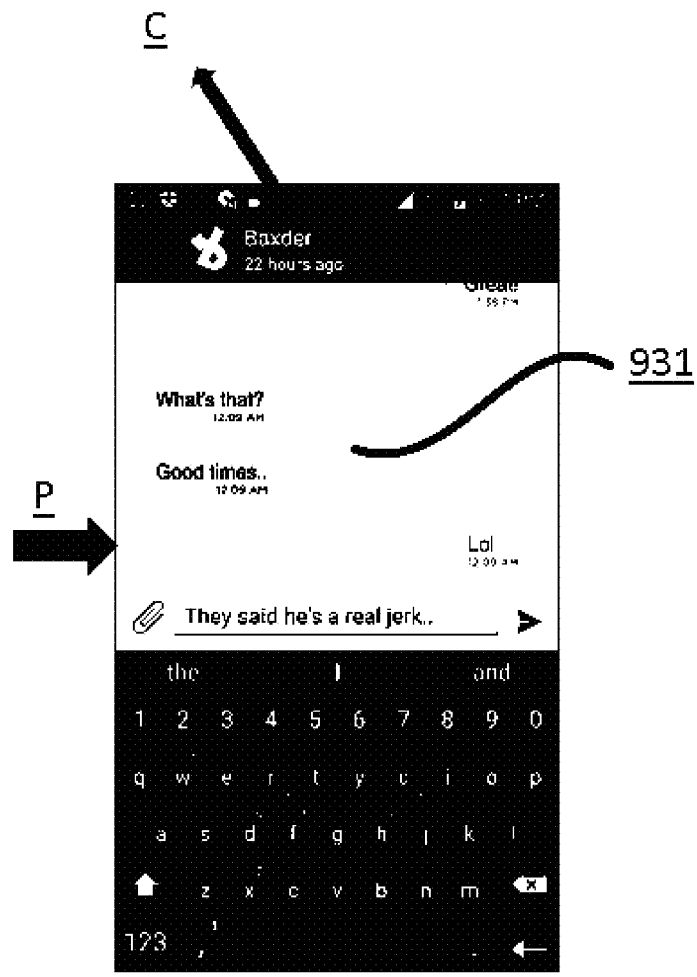
FIG. 15 illustrates a message that is about to be sent out with freeflow control enabled.

In FIG. 15, a screen shot (931) is illustrated showing a completed message to be sent with the alert word 'jerk' contained within the message. Screen (931) can either transition back to screen (920), or onwards to an example alert word definition in screen (980).

Figure 16:
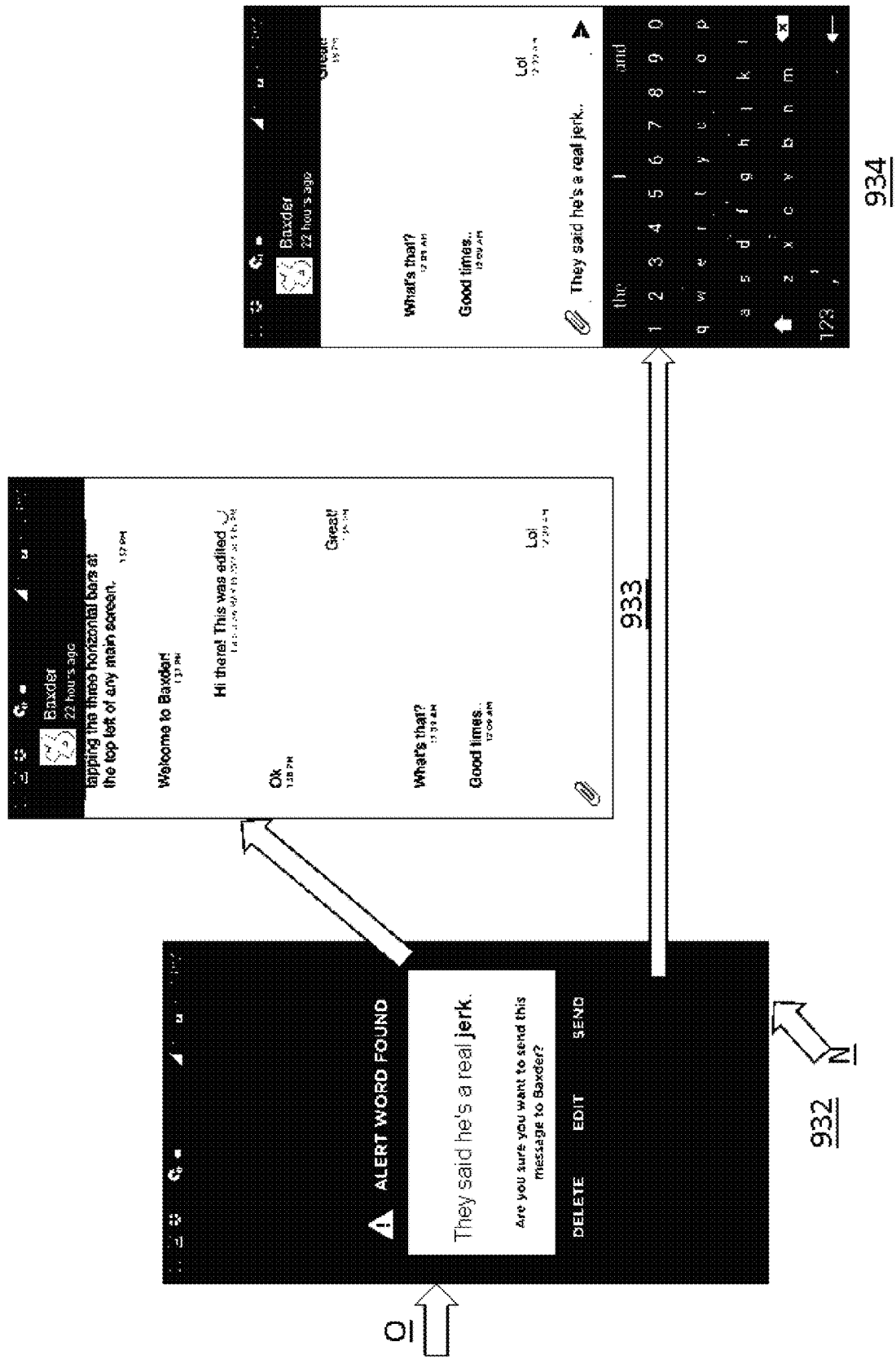
FIG. 16 illustrates a resulting detection of an alert word by the alert words control 120.

In FIG. 16, for a sake of explanation, wherein programming an alert word shall be detailed below in a freeflow disabled state (i.e. alert words active), a resulting screen (932) from sending an alert word is illustrated. In this screen (932), the sender is presented with two choices: screen (933) or screen (934). In screen (933), the sentence with the offending word ("jerk") is deleted. In screen (934), the sender is given the option to go back and re-edit/delete the offending word.

Figure 17:
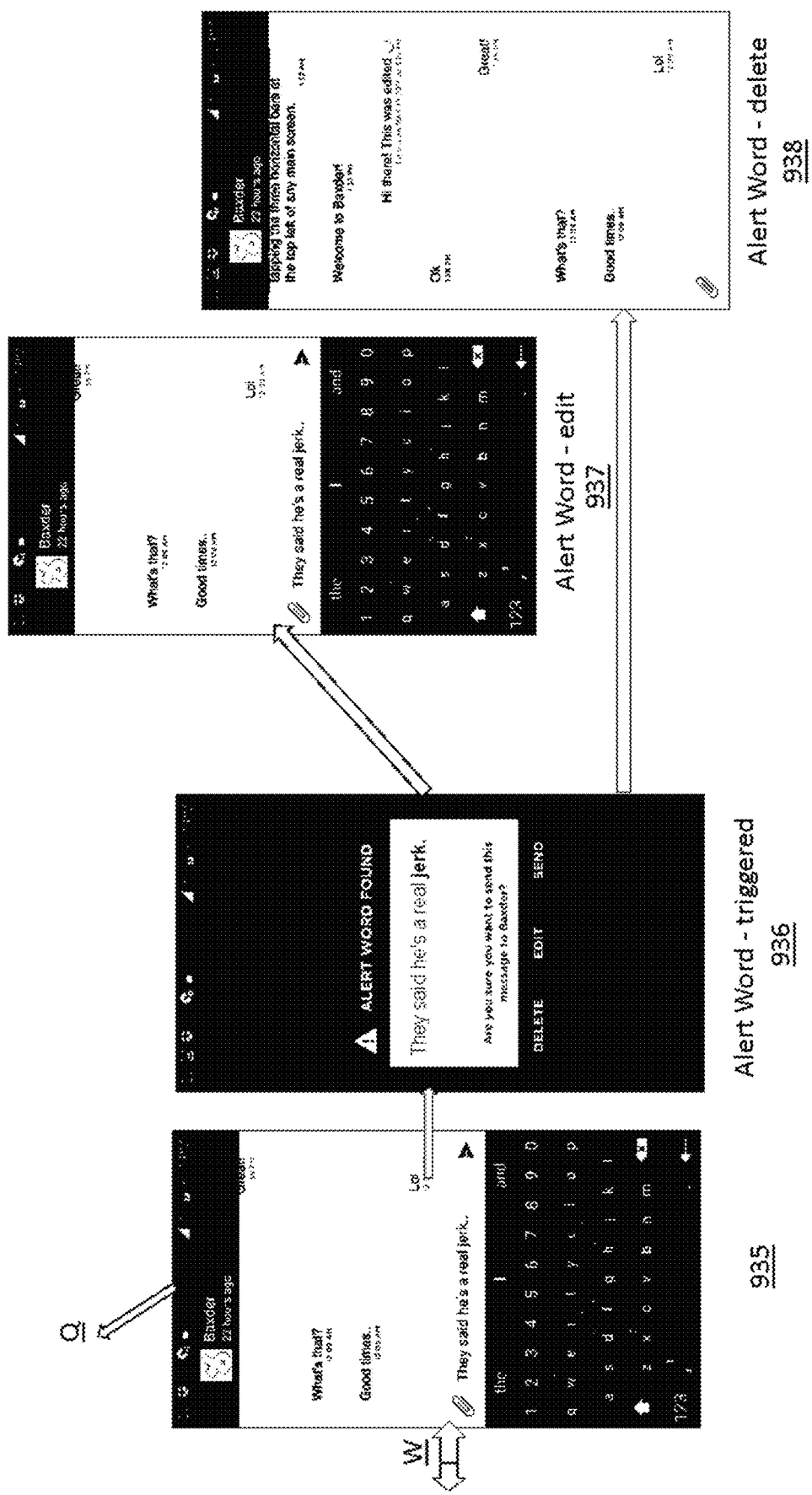
FIG. 17 illustrates options that may be taken when the alert word is detected.
Figure 18:
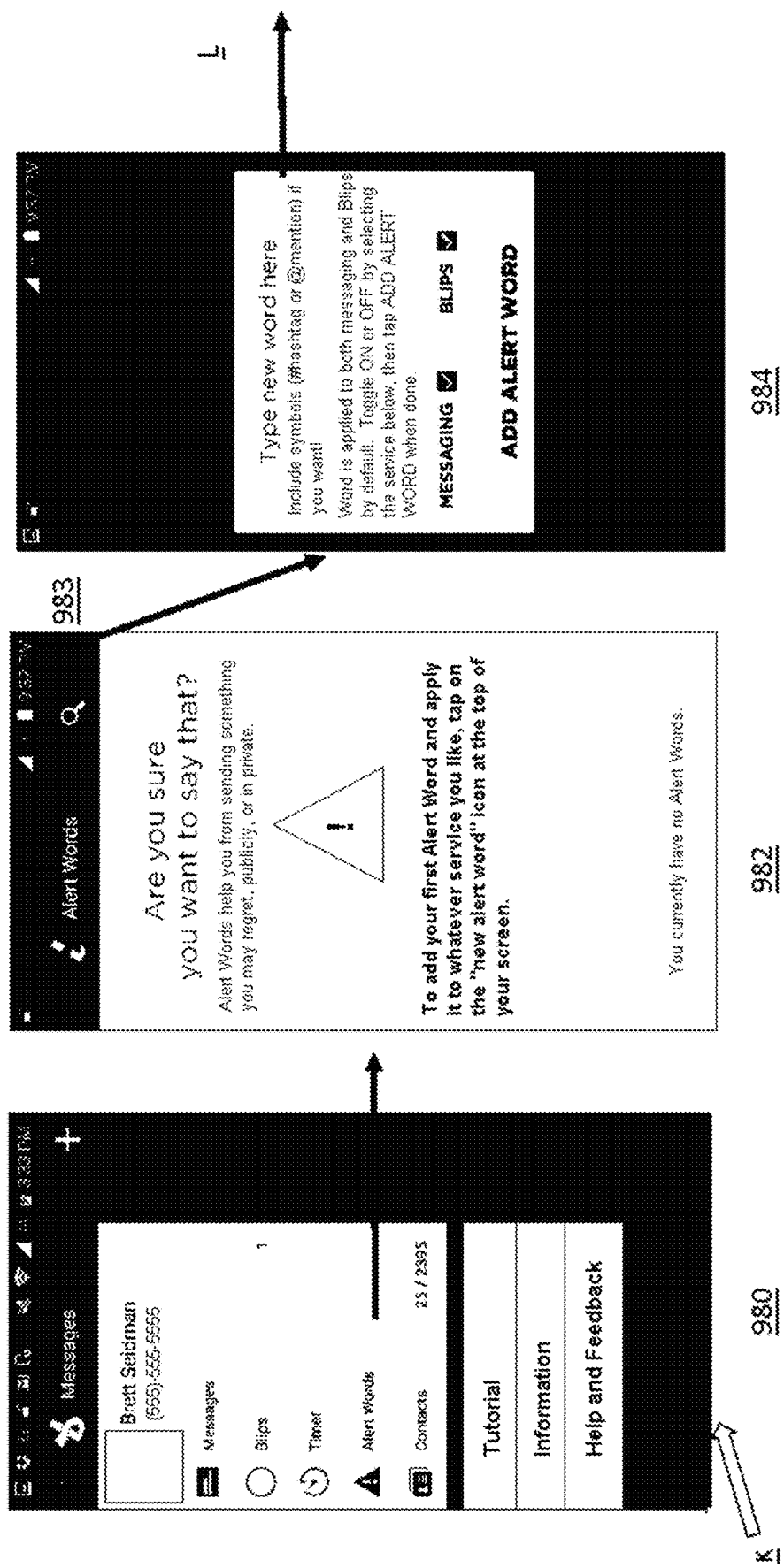
FIG. 18 illustrates screens of adding an alert word within the alert words control 120.

In FIG. 17, illustrated is what is seen by the receiver. As is illustrated, screen (935) and screen (936) are the same. However, for a given alert word that is triggered, and the alert word is edited in the send screen, such as in screen (937) of a freeflow enabled, the receiver does not see that the alert word was nearly sent, as in screen (968). Screen (938) shows a view of the application (110) of the present invention after a found alert word was deleted using the delete option in an 'Alert word found' popup dialog.

Figure 19:
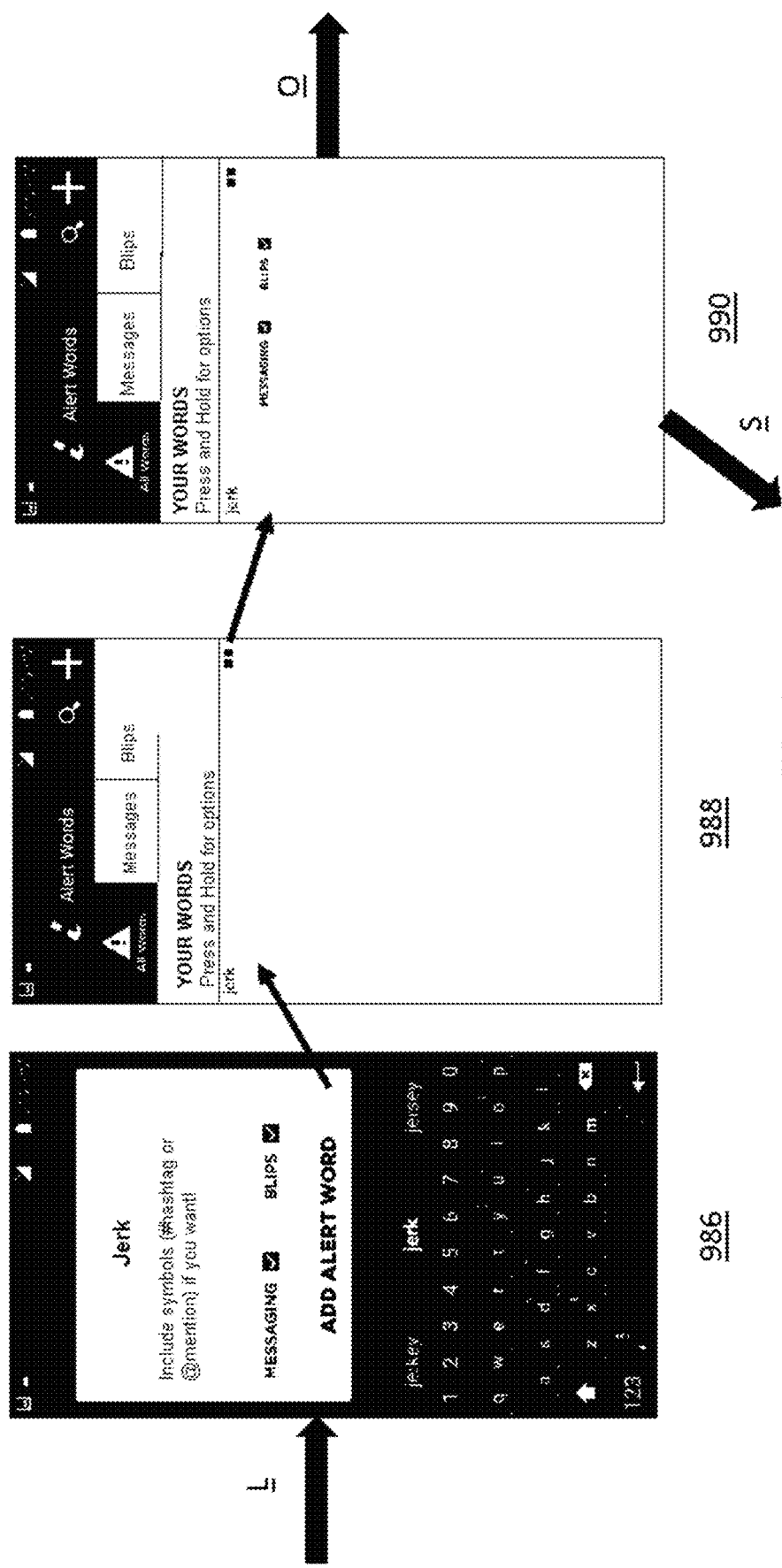
FIG. 19 illustrates further screens of adding the alert word.
Figure 20:
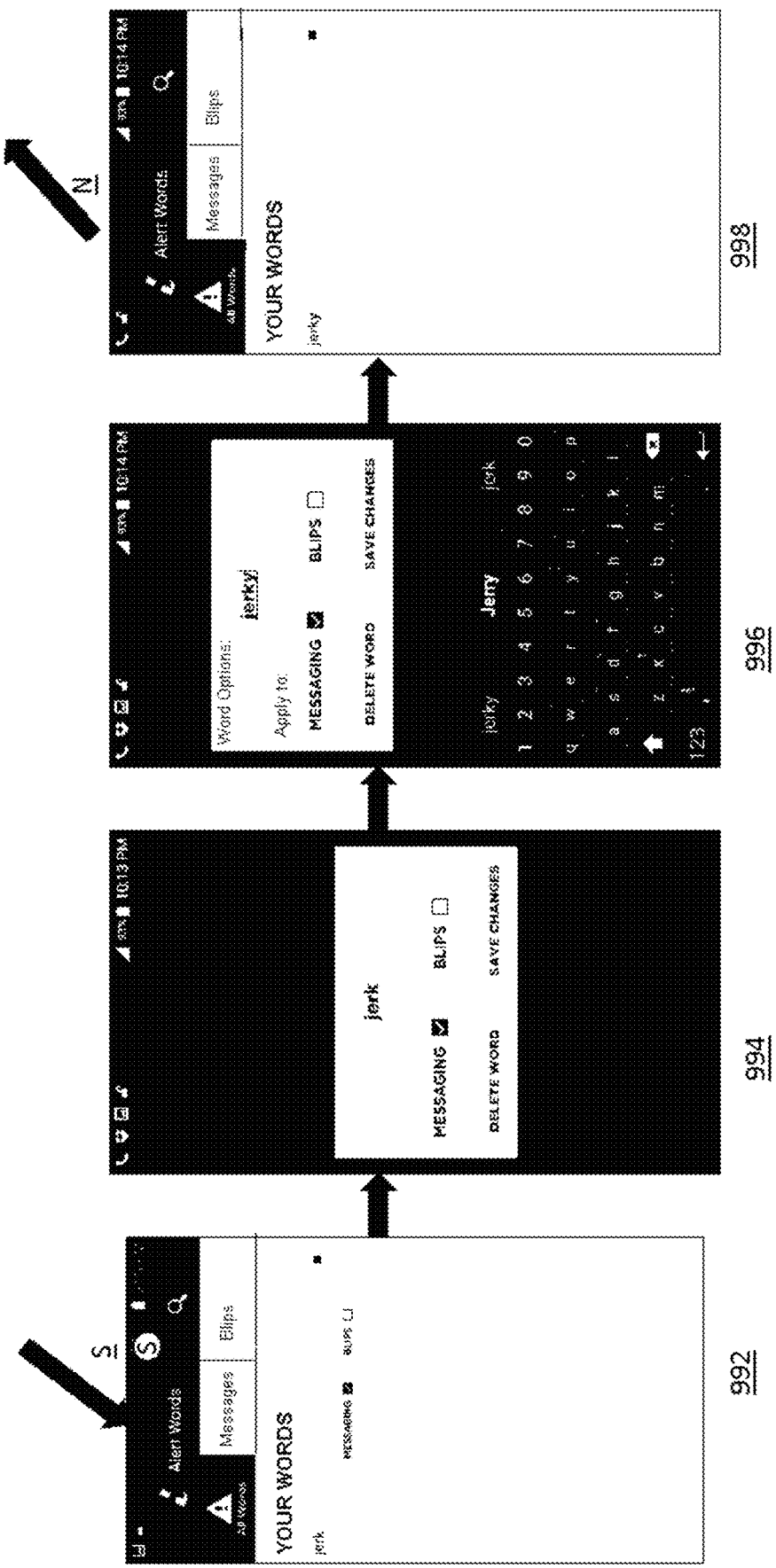
FIG. 20 illustrates an alternative flow wherein an alert word is defined for messaging within the messaging control, but not for blips within the alert words control of the present invention.

FIGS. 19 to 20 illustrate screens for programming an alert word via the menu button of the application (110) of the present invention. It should be noted that it is impossible to access screen (980) from screen (930). Screen (980) can only be accessed from using the menu button, which is preferably only found in the main screen of each major function's page, namely MESSAGES, BLIPS, TIMER, ALERT WORDS and CONTACTS. As illustrated, after hitting the "Alert Words" icon, the screen transitions into a screen (982), which is an introductory screen. After again invoking the alert word programming functionality (in this example, by invoking a "plus" sign icon (983), also referenced as the add button (185) in the bottom right corner, the screen then transitions into add alert word screen (984). This in turn transitions into screen (986) of FIG. 19.

In screen (986) of FIG. 19, the alert word is added. In a screen (988), the alert word is shown as added, as well as any other alert words that might be present. The screen (988) then transitions to a screen (990), which illustrates that the alert word can be applied to messaging (chats), blips, connected social media posts/messages, or all. If both are illustrated, the screen (990) transitions to screen (932), discussed above.

However, a user may wish to enable an alert word for either the messaging or the blips, but not both. FIG. 20 illustrates how these alert words may be defined only for one of these, in this case, messaging, although the alternative is also possible.

In FIG. 20, messaging only is selected in a screen (992). In a screen (994), the alert word "jerk" is selected for messaging only. Then in a screen (996), the word jerk is edited to be "jerky", which is then shown as being in the list of alert words in a screen shot (998), which then transitions back to screen (932).

Figure 21:
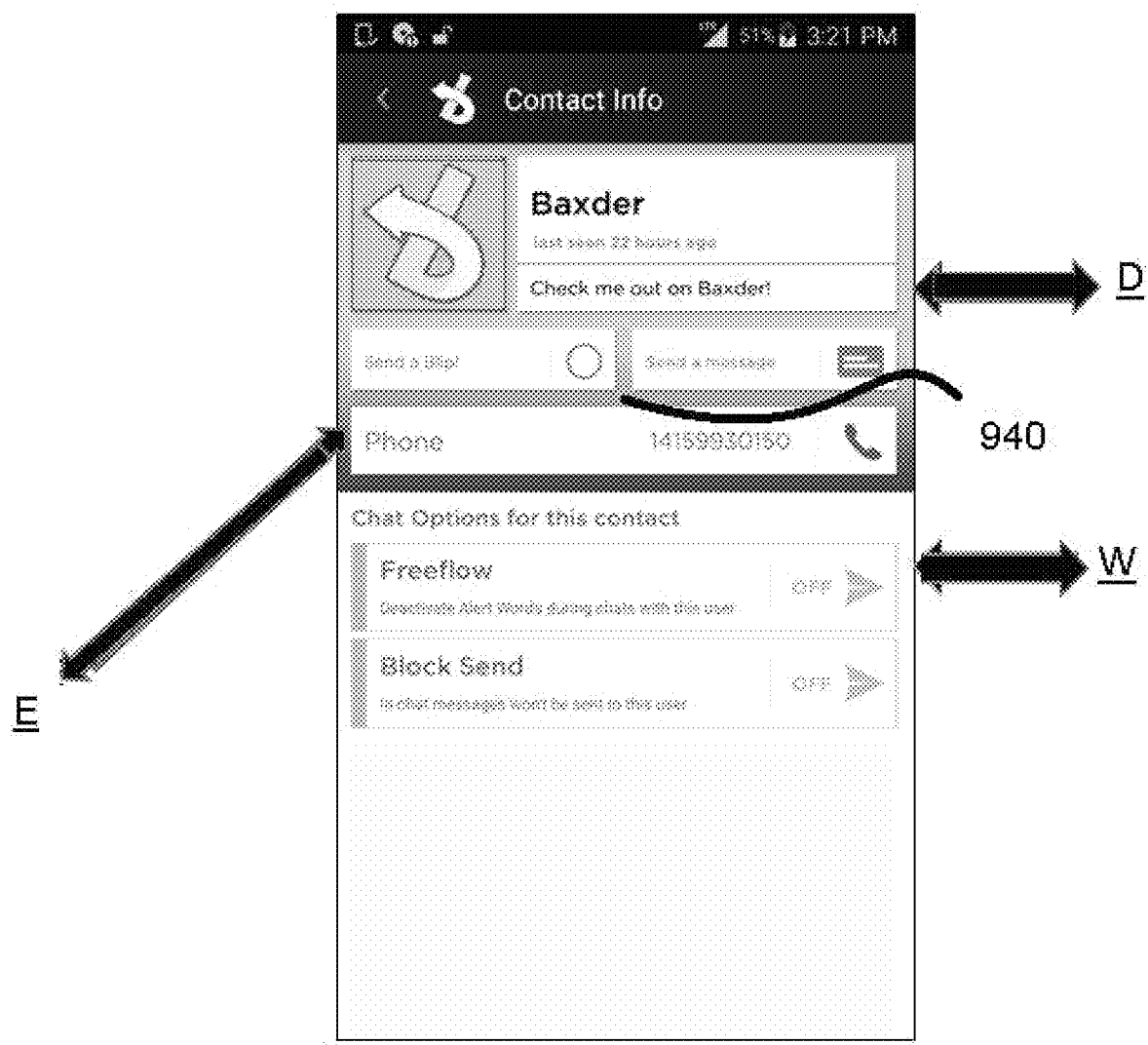
FIG. 21 illustrates an example contract profile page of the app of the present invention.

In FIG. 21, a contact info (940) screen is presented to a user. As is illustrated, the contact info screen may be transitioned to (or from) various screens (916), (935), (943), (947) although other screens may also transition to contact info.

Figure 22:
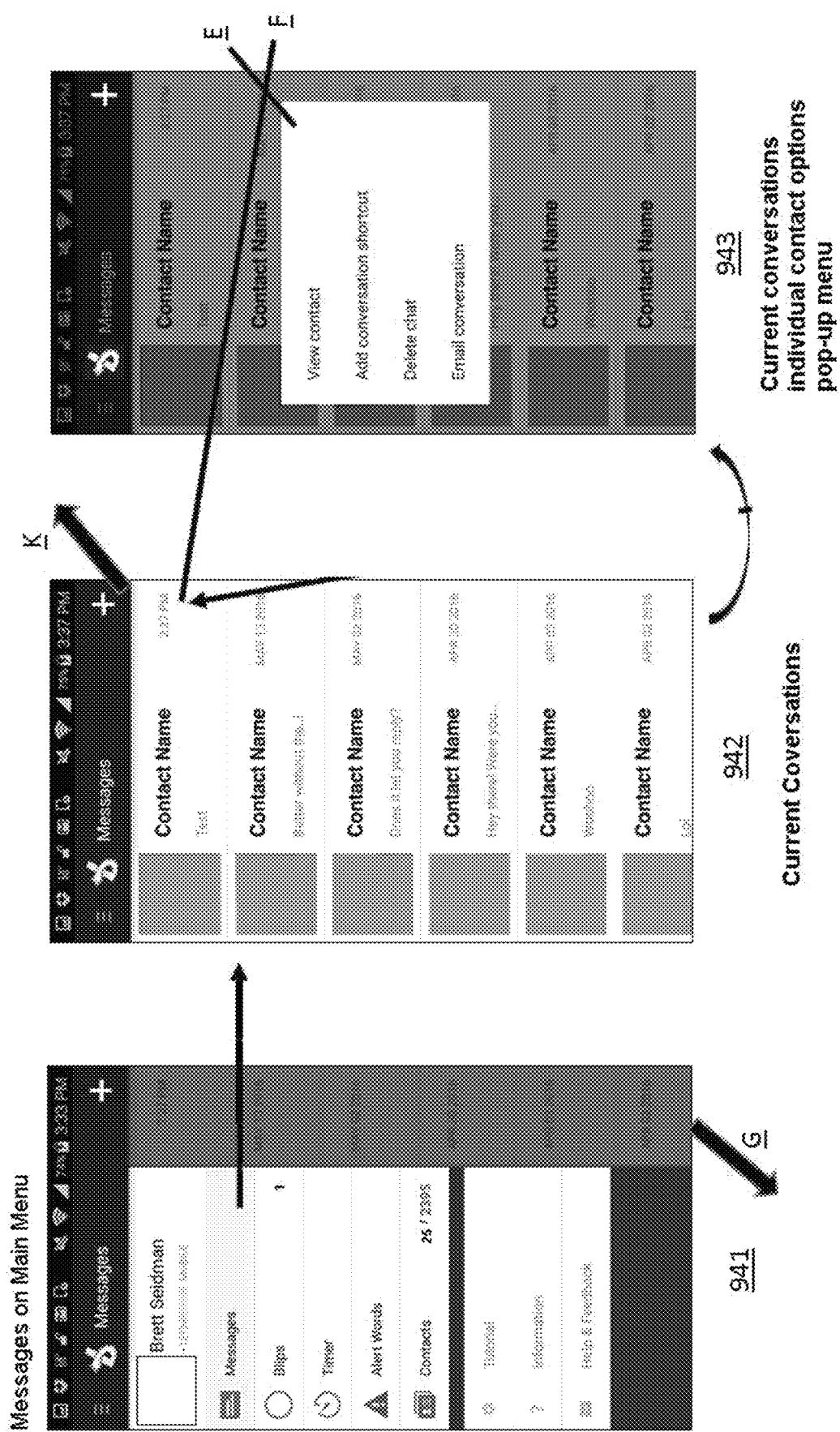
FIG. 22 illustrates example transitions of receiving further information and options associated with a particular contact of the app of the present invention.

In FIG. 22, a messages screen (941), illustrates both that one unseen blip is available in the blip inbox, and also that the messages functionality is selected. This can transition into a current conversations screen (942), alert words screen, blips screen, contacts screen or main screen (954) of the timer sequence, to be explained below. On the current conversations screen (942), the selection of a particular person with whom to communicate with by tapping their conversation will transition into their conversation, as in screen (916). By long-pressing the contact name in screen (942) a user then can transition into a popup conversation box (943), which can then be either be transitioned into the contact info screen (940). Alternatively, screen (942) can then transition to screen (916).

Figure 23:
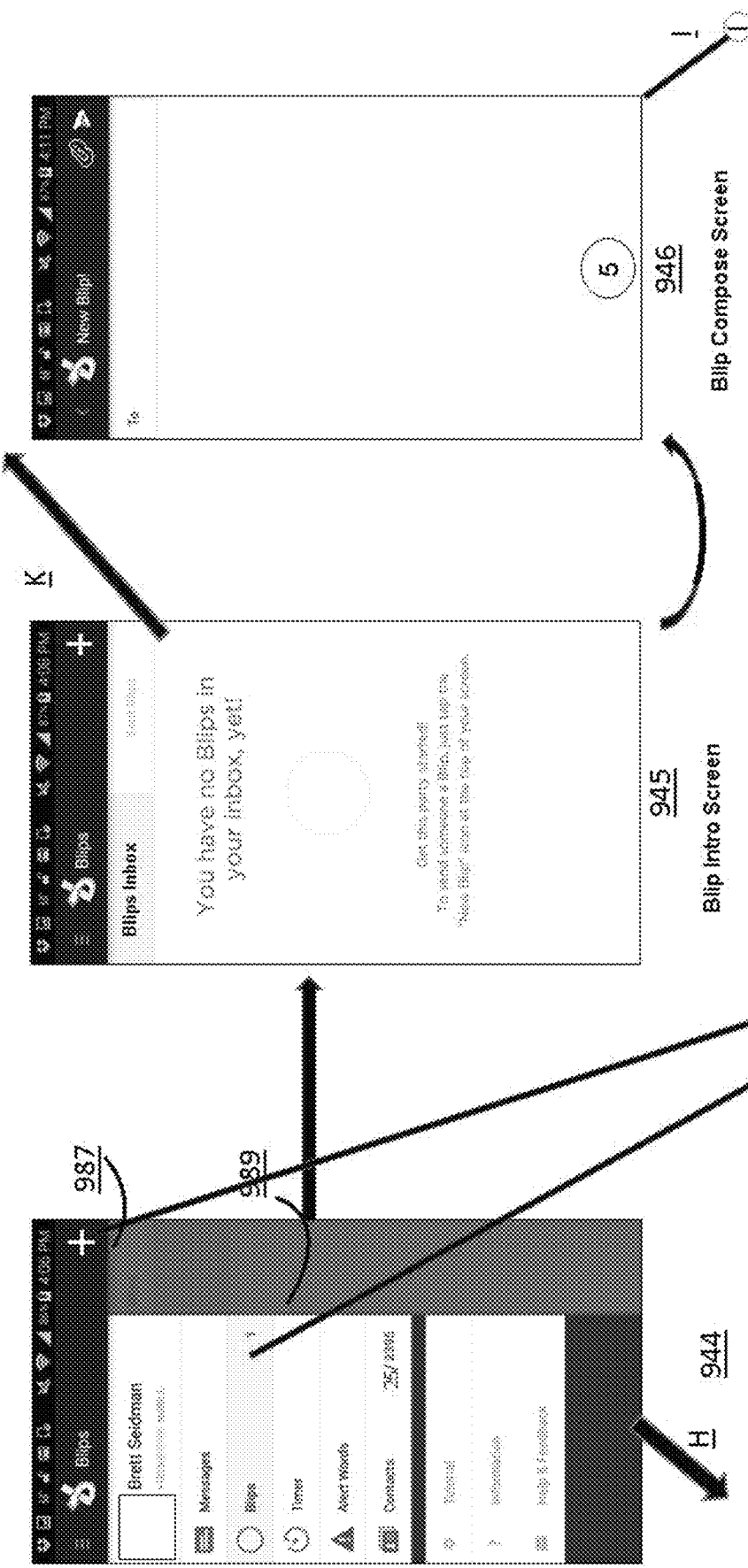
FIG. 23 illustrates introductory interfaces for the blip control of the present invention.

In FIG. 23, illustrated is a selection of an interface for selecting blips 944. After employment of an icon (987) after seeing a blips alert notice (989), the screen in this example transitions into a blip alert screen (945). Please note that the screen says "You have no Blips in your inbox, yet!" this is only for the first introduction. Also, please note that screen (944) can also transition to screen (954) of the timer sequence. The screen (945) then transitions to a screen 946, which is a compose blip screen.

Figure 24:
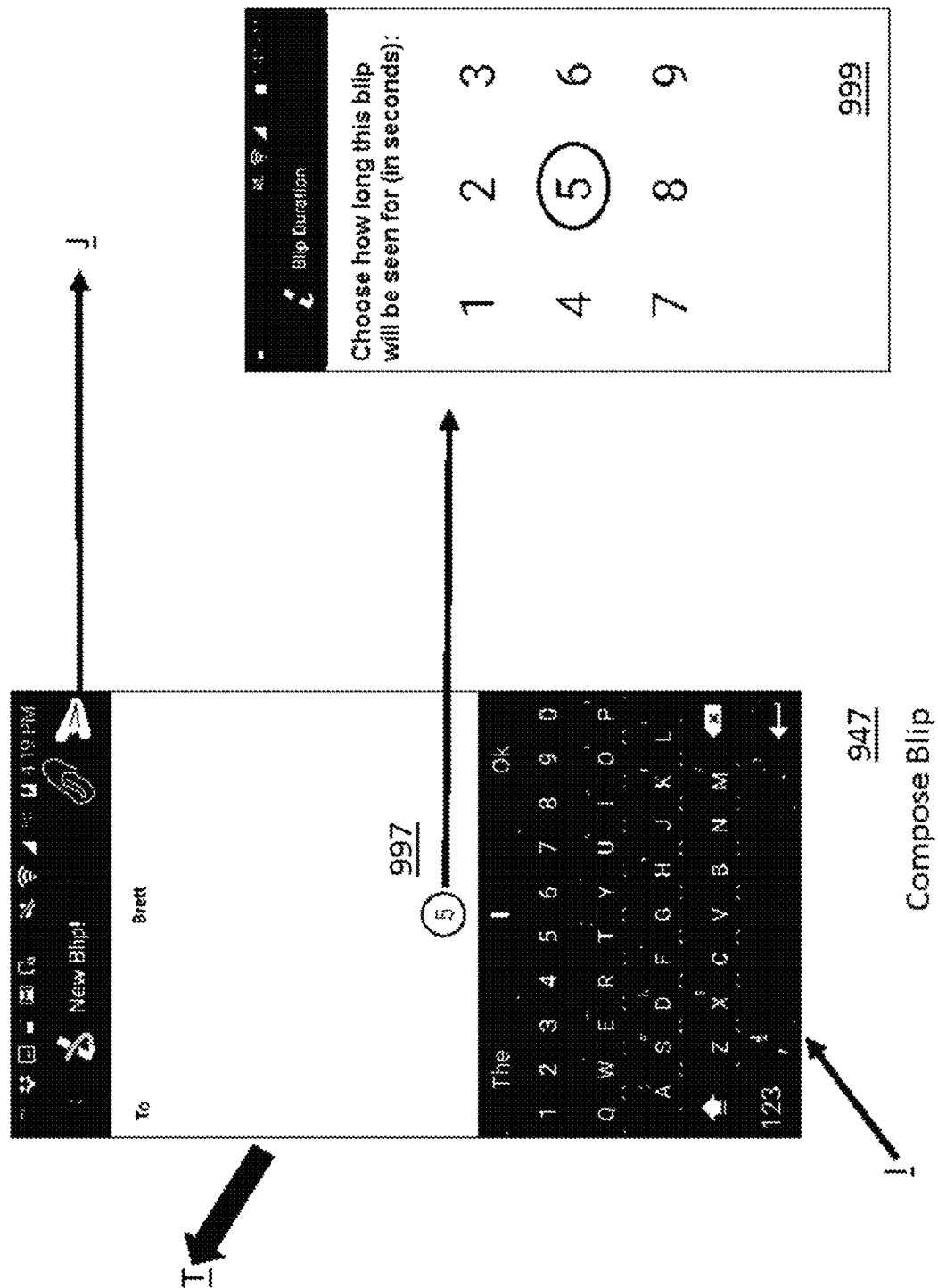
FIG. 24 illustrates a composition interface for the blip control of the present invention, including a blip duration programming state.

In a FIG. 24, a blip is also being composed. It should be noted that there is a timer icon (997), which selects the number of seconds that a blip is to be allowed to exist before it expires, a selection of which is noted in an interface of timer selection (999).

Figure 25:
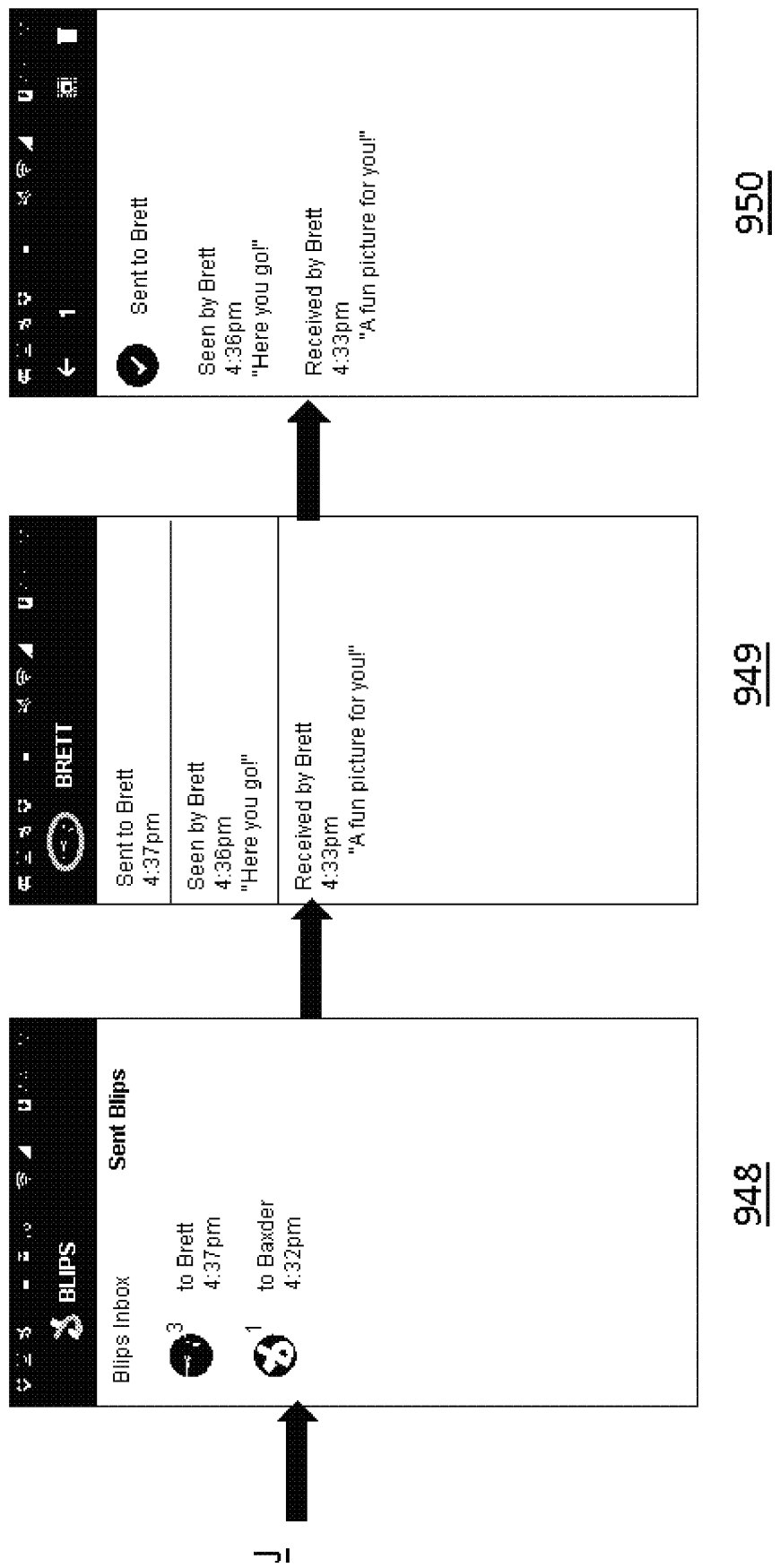
FIG. 25 illustrates example interfaces of the blip control of the present invention as seen by a sender of blips.

In FIG. 25, messages that have been sent are shown in a screen (948) as seen by a sender. In a screen (949), a status screen of blips is illustrated. In a screen (950), the sender is notified when a blip is seen by a receiver, and may include a timestamp displaying the date and time at which the blip was viewed, or the time at which the blip expired. Please note that the blip preferably remains visible on the sender's screen, and is not permanently deleted after transmission or expiration.

Figure 26:
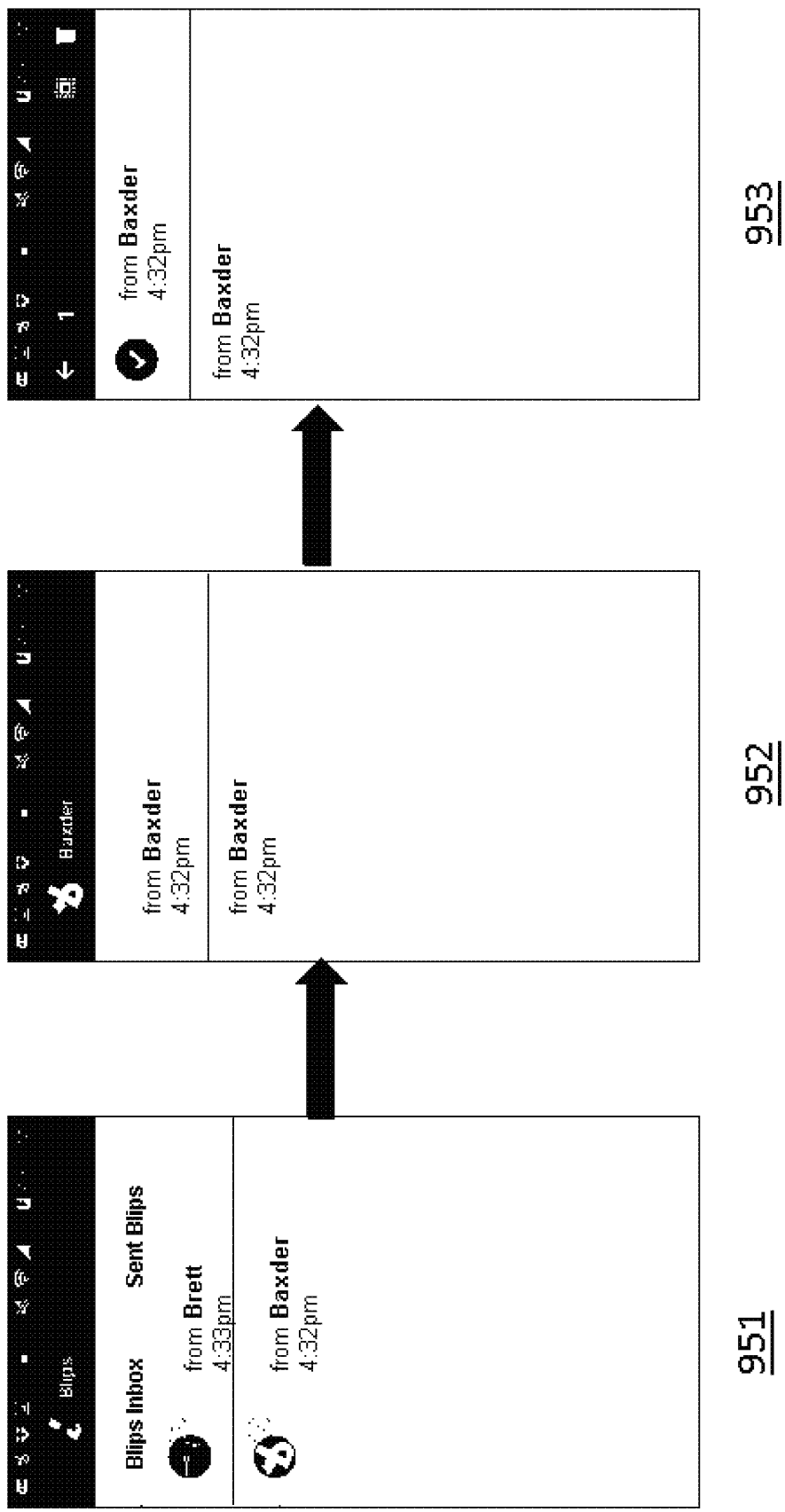
FIG. 26 illustrates example interfaces of the blip control of the present invention as seen by a receiver of blips.

In FIG. 26, illustrated is what is seen in blips by another user. In a screen (951), the app (101) receives a blip from another user. In a screen (952), the pending blips are illustrated. In a step (953), a checkmark (or other indicator) indicates that a received blip has been selected by the user and therefore can be deleted before the user chooses to view it. The receiving user can choose to view a received blip by tapping it, which will open and play/display the blip automatically, or he or she may decide to delete it without ever seeing it.

Figure 27:
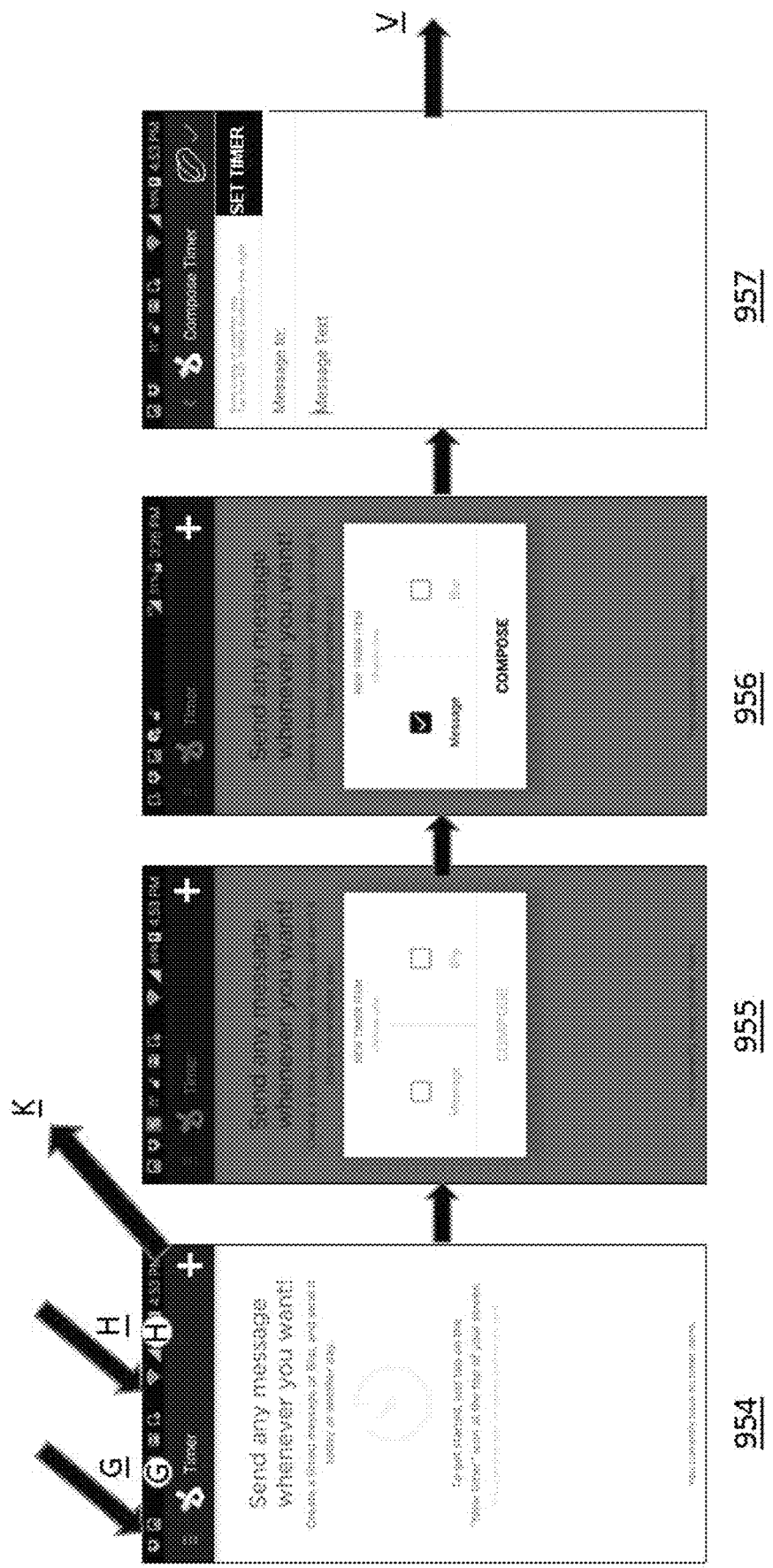
FIG. 27 illustrates introductory screens of a timer of the timer control 140 of the app of the present invention.

FIG. 27 illustrates is a main screen (954) of a timer of the present invention. The main screen (954) transitions from screen (941) and screen (954). The main screen (954) then presents an option screen (955), which is shown only when the user decides to create a new timer item by tapping the yellow-colored plus sign (983) preferably located at the bottom right of the main screen (954), which selects whether a message or a blip is to be sent out at a later time. In a step (956), a message is selected, although it could have been a blip. In a step (957), a set message timer screen is presented for composing a message text.

Figure 28:
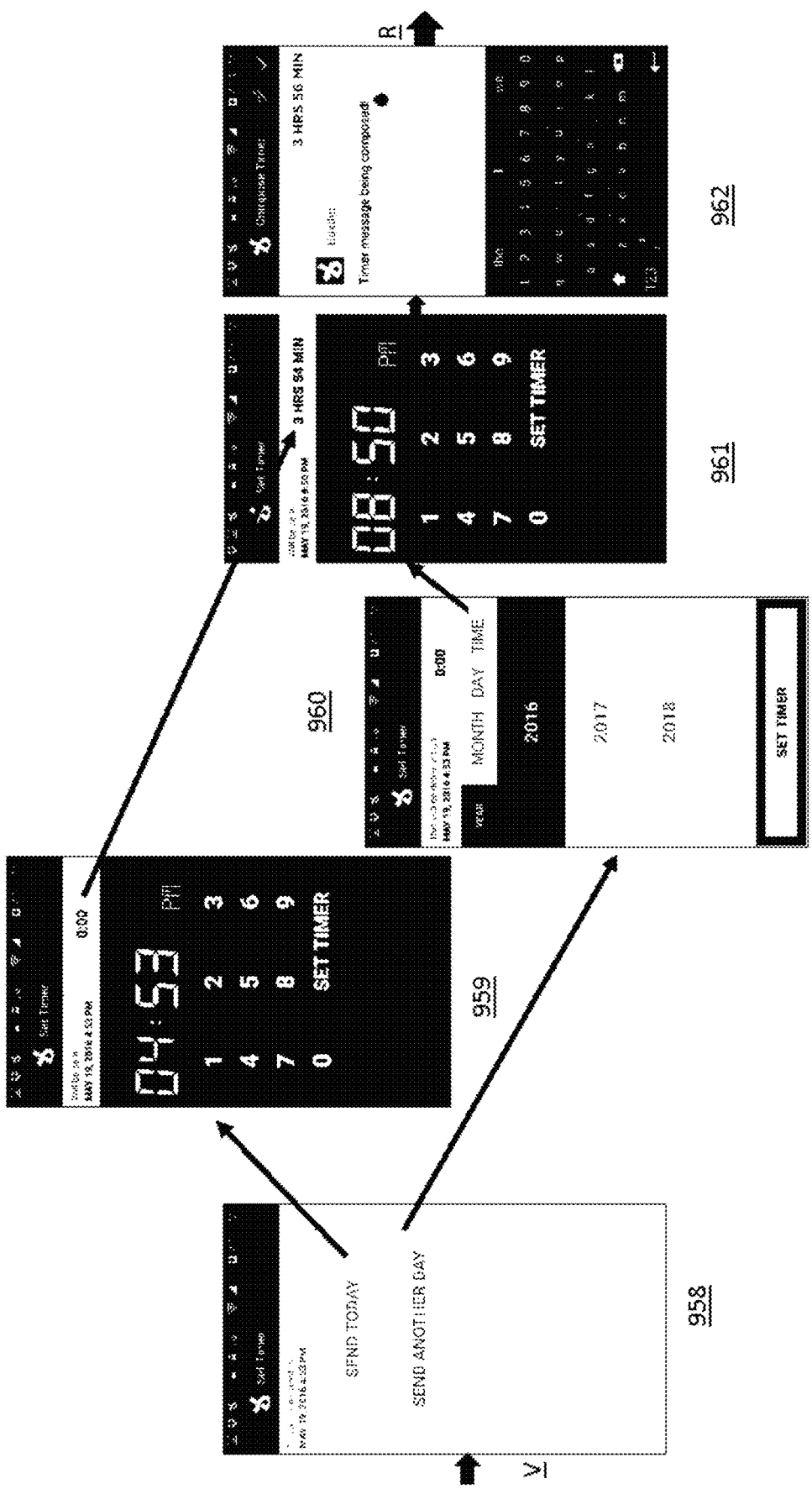
FIG. 28 illustrates entering time to send information and messages into the timer control.

Turning now to FIG. 28, a screen (958) selects whether the message is to be sent "today" or another day. If the message is to be sent today, screen (959) is selected by the user. If the message is to be sent another day, screen (960) is selected.

In screen (959), an exact time for sending "today" will be selected. Alternatively, in step (960), year, month date and time is selected. Screen (959) and screen (960) both preferably transition to screen (961). In screen (961), the time at which the message is to be sent is shown (for example, 8:50 pm.), and the date and the hours remaining until a message is sent (in this example, 3 hours 54 minutes.) Then, in a screen (962), the message is composed. Screen (962) then transitions to a screen (963) of FIG. 29.

Figure 29:
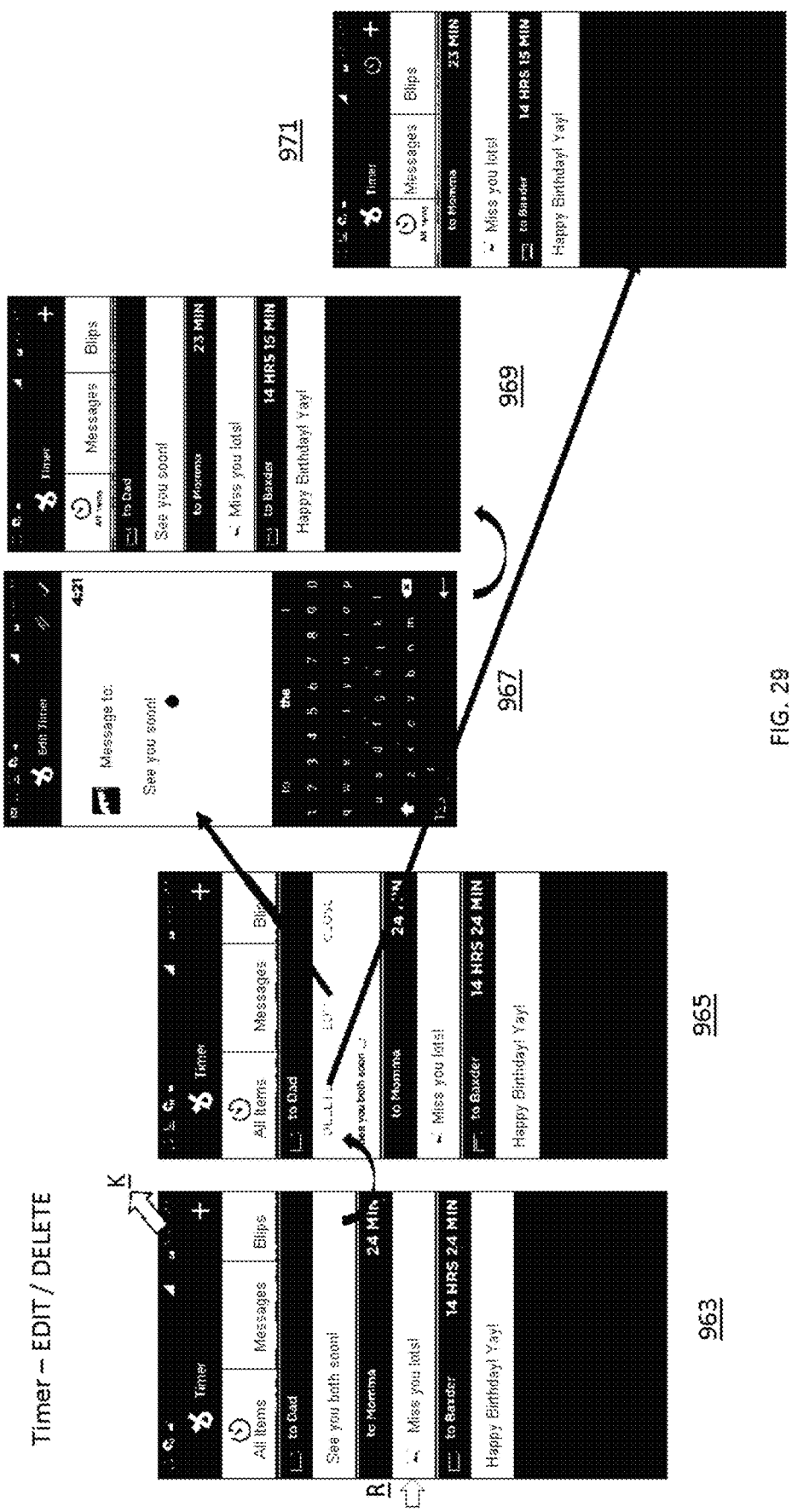
FIG. 29 illustrates editing and deleting time to send information and messages into the timer control.

In FIG. 29, in the screen (963), illustrated are various pending messages. The messages have various priority levels, such as immediate ("red") which is to be sent within five minutes, intermediate (yellow, sent within an hour), or lower priority ("green") to be sent after one hour.

In the example state diagram (900), in a step (967), the phrase "See you both soon" is to be edited. This instead becomes "See you soon." This is then illustrated as the message to be sent out in a pending messages screen (969). In an alternative screen (971), the message "See you both soon" of screen (965) is completely deleted. This is an example of cooperation with the messaging control (110).

Figure 30:
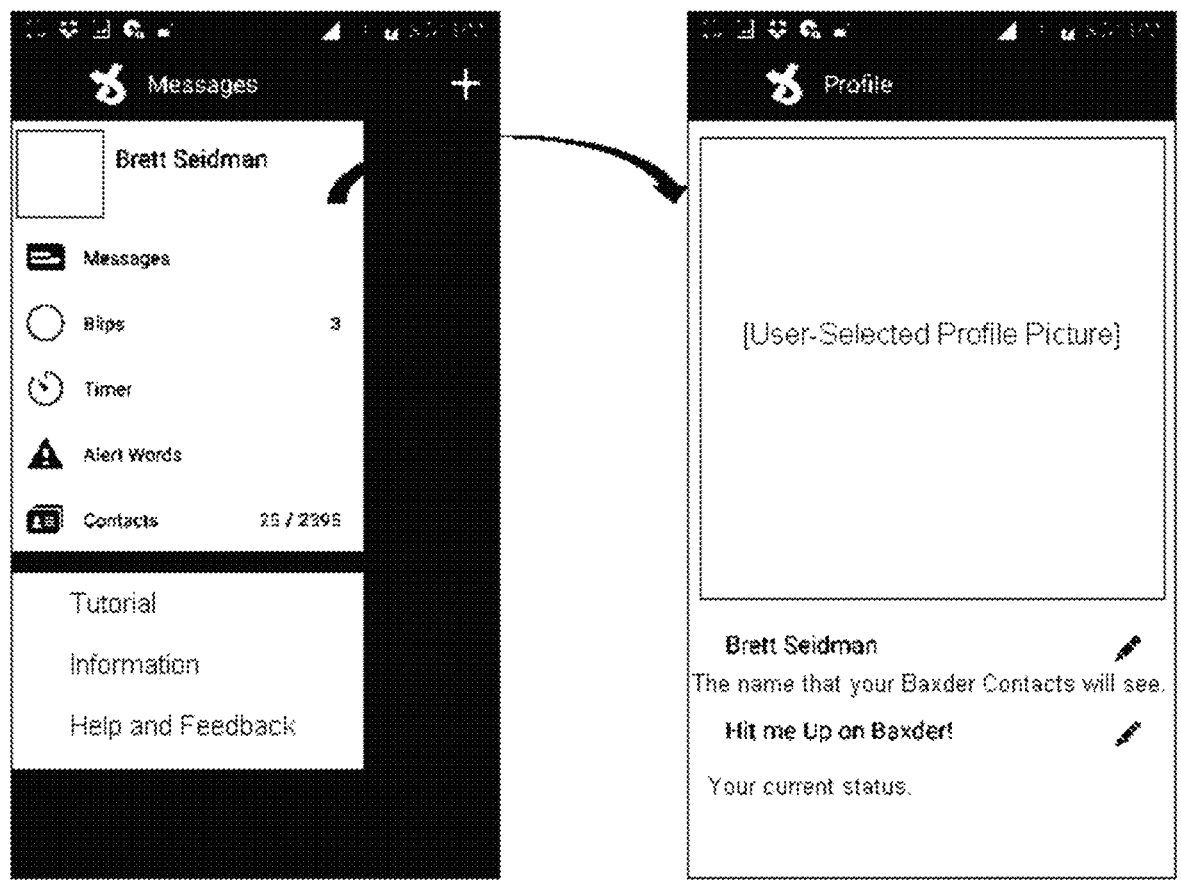
FIG. 30 illustrates a user profile page displayed within the application of the present invention, shown on a communication device.

FIG. 30 illustrates a user profile page (973), which brings up a selection screen. Upon selection of the user, the screen then transitions to screen (975), which allows a user to enter information regarding himself or herself. The profile page preferably includes a user profile picture or pictures, and may include a current status of the user, optionally provided by the user.

Figure 31:
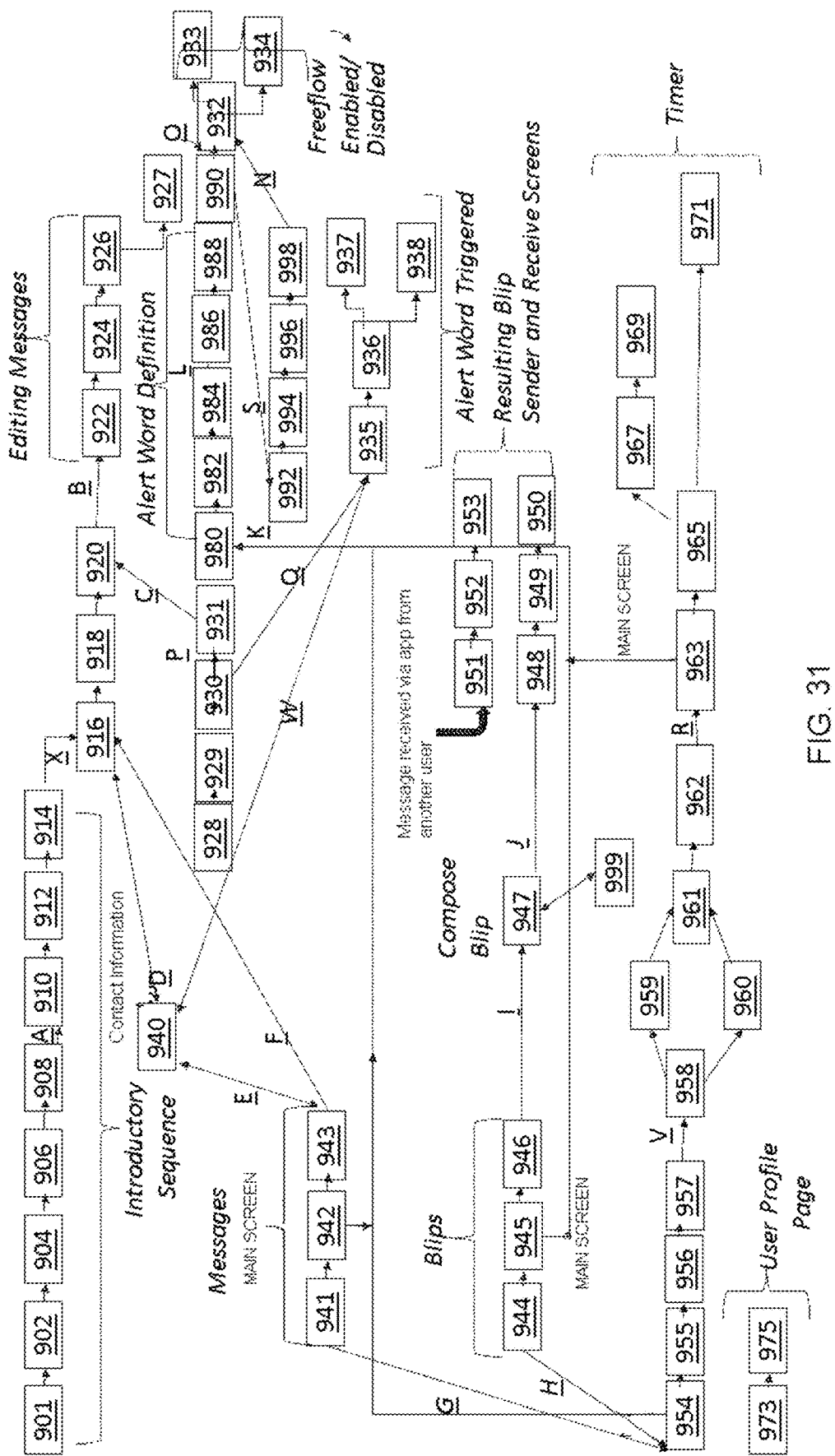
FIG. 31 illustrates an overall state diagram of the system and platform of the present invention.

FIG. 31 illustrates the state diagram (900) of the present invention. The state diagram (900) illustrates example transitions of various screens of the application (101) although other transitions are possible.

Figure 32:
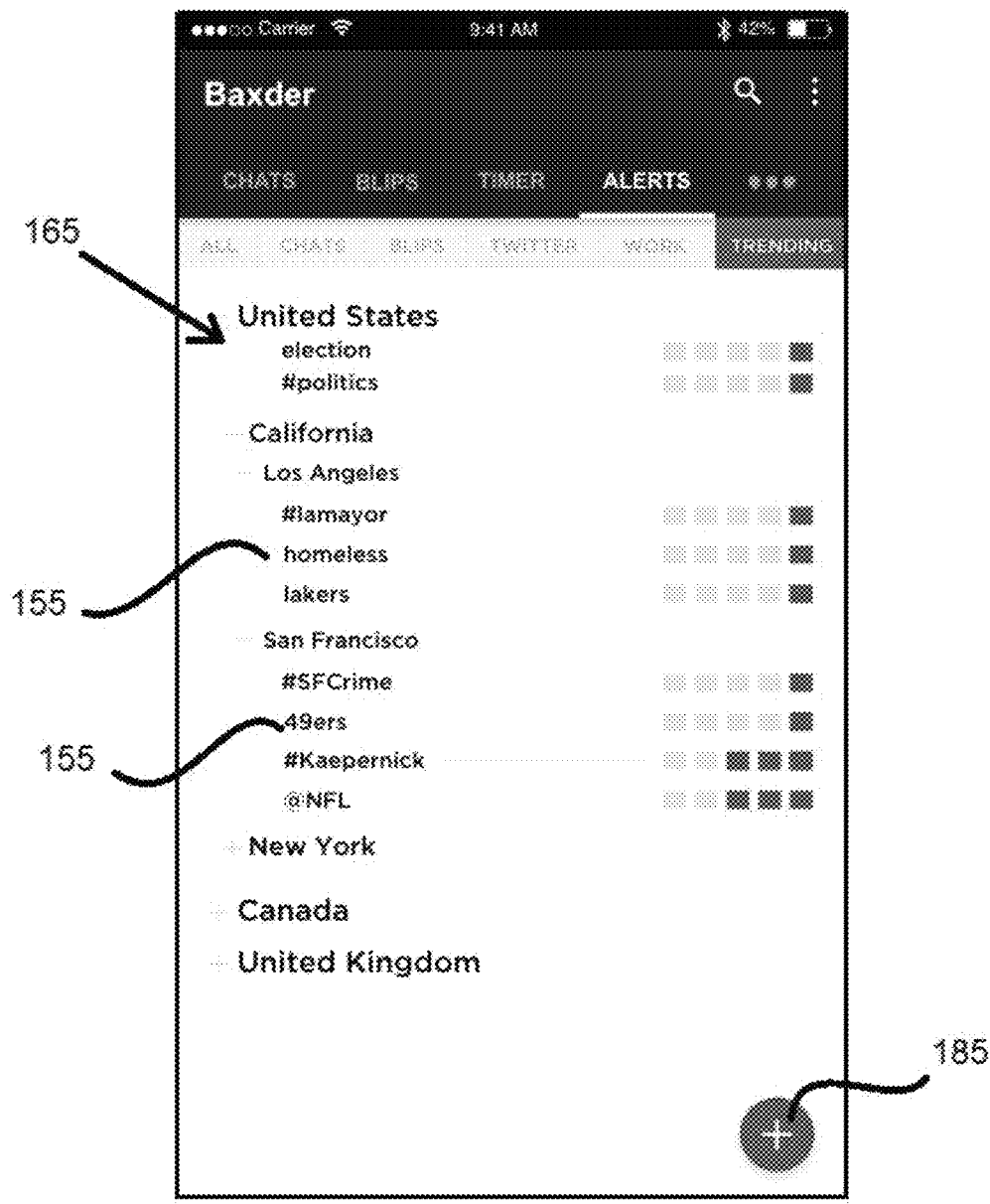
FIG. 32 depicts a view of the trending alert words list and menu of the present invention.

FIG. 32 shows a view of the alert words control (120) including the trending alert words list (165) and alert words (155) therein.

FIG. 33 displays the pop-up dialog with explanation (175) showing the reasoning behind the inclusion of the alert word of 'flint' in the alert words list (165). As noted by the explanation (175) the user is alerted to the sensitivity present regarding the word 'flint' due to the water of the area (at the time of the message drafting) was under scrutiny for being contaminated with lead.

It should be noted that the screenshot feature of the communication device (100) of the user is disabled during use of the app (101) of the present invention, and may not be enabled by either the sender nor the recipient while the app (101) is actively in use. It is envisioned that the screenshot function of the communication device (100) remains enabled whenever the app (101) of the present invention is left running in the background, but is not actively shown on the screen of the communication device (100). As such, it should be understood that the deactivation of this common communication device feature is critical in providing control over messages sent by the sender.

Further, it should be understood that when a message is deleted by a sender, the message is deleted from the recipient's device as well, even after it has been read or buried within the chat history. Deletion may happen at the will of the user at any point in the future.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

I claim:

1. A method of communicating via a communication device which minimizes the likelihood of the transmission of a gaffe/ill-advised statement comprising:
    starting an application on the communication device;
    the application populating a list of alert words comprising taboo words and ill-advised statements;
    interfacing the application with a transmitter of the communication device;
    writing a text-based message;
    wherein the text-based message contains a taboo word;
    instructing the application to send the text-based message;
    the application cross-referencing the text of the text-based message against at least one list of alert words, the at least one list of alert words containing the taboo word;
    the application causing an indicator appear on a screen of the communication device, the indicator displaying an alert regarding the identified taboo word; and
    the indicator presenting options to edit, delete, or send the message as-is in an effort to prevent a gaffe/ill-advised statement.

2. The method of claim 1, further comprising:
    the application identifying the taboo word as a word potentially capable of causing a gaffe if transmitted.

3. The method of claim 1, further comprising:
    the application transmitting the text-based message;
    instructing the application to delete the text-based message post-transmission;
    the application deleting the text-based message from a recipient network-connected device; and
    the application deleting the text-based message from the network-connected device, including all history that the message was transmitted.

4. The method of claim 1, further comprising:
    the indicator prompting a reevaluation of the text-based message.

5. The method of claim 1, wherein taboo words are aggregated to the at least one list of alert words based on up-to-date news stories, referenced as trending alert words.

6. The method of claim 1, wherein the at least one list of alert words is customized based on user selection of the source of the list.

7. The method of claim 1, wherein the at least one list of alert words is derived, in part, based on a physical location of the communication device.

8. A method of communicating via a communication device which minimizes the likelihood of the reception of a gaffe via a text message comprising:
    writing a text-based message on an application;
    instructing the application to send the text-based message;
    the application causing an indicator to appear on a screen of the communication device, the indicator displaying an alert regarding an identified taboo word which is identified as a match from at least one alert words list;
    the indicator presenting options to edit, delete, or send the message as-is in an effort to prevent a gaffe;
    the application transmitting the text-based message;
    instructing the application to delete the text-based message post-transmission;
    the application deleting the text-based message from a recipient communication device;
    the application deleting the text-based message from the communication device; and
    the application indicating that all history of the message and its' transmission has been removed by virtue of the message no longer being displayed.

9. A method of communicating via a communication device which minimizes the likelihood of the reception of a gaffe via a text message comprising:
    writing a text-based message on an application;
    instructing the application to send the text-based message;
    the application causing an indicator to appear on a screen of the communication device, the indicator displaying an alert regarding an identified taboo word which is identified as a match from at least one alert words list;
    the indicator presenting options to edit, delete, or send the message as-is in an effort to prevent a gaffe;
    the application transmitting the text-based message; and
    the application positing positive words to use within the text-based message, the posited alternative words provided from at least one list of positive words populated in part by a crawl of geographically pertinent positive news stories of a user-selected geographic region.

10. A method of communicating via a communication device which minimizes the likelihood of the transmission of a gaffe/ill-advised statement comprising:
    starting an application on the communication device;
    the application populating at least one list of alert words comprising taboo words and ill-advised statements;
    the application populating at least one list of alert words comprising positive words correlated to positive events and stories present in the news related to a selected geographical region;
    interfacing the application with a transmitter of the communication device;
    writing a text-based message;
    wherein the text-based message contains a taboo word;
    instructing the application to send the text-based message;
    the application cross-referencing the text of the text-based message against at least one list of alert words, the at least one list of alert words containing the taboo word;
    the application causing an indicator appear on a screen of the communication device, the indicator displaying an alert regarding the identified taboo word;
    the application positing alternative words to use instead of the identified taboo word, the posited alternative words provided from the at least one list of positive words; and
    the indicator presenting options to edit, delete, or send the message as-is in an effort to prevent a gaffe/ill-advised statement.

* * * * *